(12) United States Patent
Shimode et al.

(10) Patent No.: US 10,656,308 B2
(45) Date of Patent: May 19, 2020

(54) ANTISTATIC HARD COAT FILM, POLARIZING PLATE, TOUCH PANEL, LIQUID CRYSTAL DISPLAY DEVICE, AND MANUFACTURING METHOD

(71) Applicant: ZEON CORPORATION, Chiyoda-ku, Tokyo (JP)

(72) Inventors: Mana Shimode, Tokyo (JP); Hitoshi Ooishi, Tokyo (JP); Manabu Tsuburaya, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/763,993

(22) PCT Filed: Sep. 29, 2016

(86) PCT No.: PCT/JP2016/078936
§ 371 (c)(1),
(2) Date: Mar. 28, 2018

(87) PCT Pub. No.: WO2017/057640
PCT Pub. Date: Apr. 6, 2017

(65) Prior Publication Data
US 2018/0275317 A1   Sep. 27, 2018

(30) Foreign Application Priority Data

Sep. 30, 2015 (JP) .................. 2015-192560

(51) Int. Cl.
*G02F 1/1333* (2006.01)
*G02B 1/14* (2015.01)
(Continued)

(52) U.S. Cl.
CPC ............ *G02B 1/14* (2015.01); *B29D 11/0073* (2013.01); *B29D 11/00865* (2013.01);
(Continued)

(58) Field of Classification Search
None
See application file for complete search history.

(56) References Cited

U.S. PATENT DOCUMENTS 5,344,900 A * 9/1994 Maezawa ............... C08G 61/08
526/160
6,313,577 B1 * 11/2001 Kunisada ............... G02B 1/116
313/479
(Continued)

FOREIGN PATENT DOCUMENTS

CN      102667534 A     9/2012
JP      H0314882 A      1/1991
(Continued)

OTHER PUBLICATIONS

Apr. 3, 2018, International Preliminary Report on Patentability issued in the International Patent Application No. PCT/JP2016/078936.
(Continued)

*Primary Examiner* — James A Dudek
(74) *Attorney, Agent, or Firm* — Kenja IP Law PC

(57) ABSTRACT

An antistatic hard coat film including: a substrate film formed of a thermoplastic resin containing a cycloolefin polymer; and an antistatic hard coat layer provided on the substrate film, the antistatic hard coat layer containing electroconductive metal oxide fine particles, wherein the antistatic hard coat layer has a surface resistance value of $1.0\times10^6$ Ω/sq. or more and $1.0\times10^{10}$ Ω/sq. or less, and the number of streaks each having a length of 20 cm or longer of the antistatic hard coat layer is 2 or less per area of 1,330 mm×500 mm of the antistatic hard coat layer, and the production method thereof, as well as a polarizing plate, a touch panel, and a liquid crystal display device including the antistatic hard coat film.

12 Claims, 1 Drawing Sheet

(51) Int. Cl.
  *G02B 1/16* (2015.01)
  *B29D 11/00* (2006.01)
  *G06F 3/041* (2006.01)
  *G02F 1/1343* (2006.01)
  *G02B 5/30* (2006.01)
  *G02F 1/1335* (2006.01)

(52) U.S. Cl.
  CPC ......... *G02B 1/16* (2015.01); *G02F 1/134363* (2013.01); *G06F 3/041* (2013.01); *G02B 5/3033* (2013.01); *G02F 1/13338* (2013.01); *G02F 1/133528* (2013.01); *G02F 2201/50* (2013.01); *G02F 2202/022* (2013.01); *G02F 2202/16* (2013.01); *G02F 2202/22* (2013.01)

(56) References Cited

U.S. PATENT DOCUMENTS

| | | | | |
|---|---|---|---|---|
| 2003/0105207 | A1* | 6/2003 | Kleyer | C08K 5/04 524/439 |
| 2003/0179343 | A1* | 9/2003 | Marechal | G02B 1/116 351/159.62 |
| 2008/0096044 | A1* | 4/2008 | Matsumoto | C03C 17/10 428/623 |
| 2008/0198446 | A1* | 8/2008 | Asakura | G02B 5/208 359/352 |
| 2009/0130342 | A1* | 5/2009 | Endo | B29C 47/0021 428/1.3 |
| 2010/0239859 | A1* | 9/2010 | Song | C09J 133/26 428/355 CN |
| 2012/0026456 | A1* | 2/2012 | Nishimoto | C23C 14/083 351/159.01 |
| 2014/0030511 | A1* | 1/2014 | Amano | C09J 165/00 428/336 |
| 2014/0320959 | A1* | 10/2014 | Jun | G02B 27/22 359/464 |
| 2016/0152843 | A1* | 6/2016 | Hwang | C09D 5/24 349/12 |
| 2016/0202525 | A1* | 7/2016 | Tanaka | G02F 1/13338 349/12 |
| 2016/0340550 | A1* | 11/2016 | Tsukamoto | C09D 183/06 |
| 2016/0347930 | A1* | 12/2016 | Okafuji | B32B 27/365 |
| 2016/0349413 | A1* | 12/2016 | Nakata | G02B 5/305 |
| 2017/0190922 | A1* | 7/2017 | Ko | G06F 3/044 |
| 2017/0192134 | A1* | 7/2017 | Hwang | G02B 1/16 |
| 2017/0238403 | A1* | 8/2017 | Ooishi | B32B 7/02 349/40 |
| 2018/0275317 | A1* | 9/2018 | Shimode | G02F 1/13338 |
| 2018/0321532 | A1* | 11/2018 | Sasada | G02F 1/13363 |

FOREIGN PATENT DOCUMENTS

| | | |
|---|---|---|
| JP | H03122137 A | 5/1991 |
| JP | H0463807 A | 2/1992 |
| JP | H08325399 A | 12/1996 |
| JP | 2008233882 A | 10/2008 |
| JP | 2013242692 A | 12/2013 |
| JP | 2014238930 A | 12/2014 |
| TW | 200643040 A | 12/2006 |
| TW | 201130658 A1 | 9/2011 |
| WO | 2006109528 A1 | 10/2006 |
| WO | 2011074402 A1 | 6/2011 |
| WO | 2016063793 A1 | 4/2016 |

OTHER PUBLICATIONS

Dec. 27, 2016, International Search Report issued in the International Patent Application No. PCT/JP2016/078936.
Mar. 25, 2019, Office Action issued by the State Intellectual Property Office in the corresponding Chinese Patent Application No. 201680056598.3.
Dec. 20, 2019, Office Action issued by the Taiwan Intellectual Property Office in the corresponding Taiwanese Patent Application No. 105131549.

* cited by examiner

ANTISTATIC HARD COAT FILM, POLARIZING PLATE, TOUCH PANEL, LIQUID CRYSTAL DISPLAY DEVICE, AND MANUFACTURING METHOD

FIELD

The present invention relates to an antistatic hard coat film, a polarizing plate, a touch panel, a liquid crystal display device, and a method for producing the antistatic hard coat film.

BACKGROUND

Hitherto, an antistatic film having an antistatic function has been developed (see Patent Literature 1).

CITATION LIST

Patent Literature

Patent Literature 1: Japanese Patent Application Laid-Open No. Hei. 8-325399 A

SUMMARY

Technical Problem

A liquid crystal display device offers advantages, such as high image quality, thin thickness, lightweight, and low power consumption, and is widely used in, for example, a television set, a personal computer, a car navigation system, and the like. The liquid crystal display device achieves display of an image on a display screen by having a liquid crystal cell disposed between two polarizers (that is, a light-incident side polarizer and a light-emission side polarizer) that are disposed such that their transmission axes are orthogonal to each other, and applying a voltage to the liquid crystal cell to change orientation of liquid crystal molecules.

Further, in recent years, a liquid crystal display device equipped with a touch panel has been widely used in portable terminals, such as, for example, a cellular phone and a tablet-type personal computer. In the liquid crystal display device equipped with the touch panel, electric charges may be accumulated in a member constituting the liquid crystal display device when a user touches the touch panel. The electric charges accumulated in this manner may disturb a drive control of the liquid crystal molecules in the liquid crystal cell. Thus, it is conceivable to provide an antistatic film in the liquid crystal display device to suppress the accumulation of the electric charges as described above.

The antistatic film is generally formed by applying an antistatic agent onto a substrate. However, there is a problem in that the antistatic agent may have a short pot life depending on types of electroconductive particles and a binder contained in the antistatic agent. The antistatic agent having a short pot life tends to cause increase in its viscosity. Applying the antistatic agent having an increased viscosity onto a substrate causes a problem of creating coating streaks, thereby deteriorating coating appearance. Further, the coating streaks affect a thickness of the coating film and thus a surface resistance value thereof, which may cause significant unevenness in driving of the liquid crystal.

The antistatic film described in Patent Literature 1 uses only a polyester film as the substrate and has a drawback in that its use application is limited.

The present invention has been created in consideration of the above-mentioned problems, and an object of the present invention is to provide an antistatic hard coat film having few streaks and a surface resistance value within a prescribed range, a polarizing plate, a touch panel, and a liquid crystal display device, each including the antistatic hard coat film, and a method for producing the antistatic hard coat film.

Solution to Problem

As a result of intensive studies by the present inventor to solve the above-mentioned problems, the present inventor has found that an antistatic hard coat film, which includes a substrate film formed of a thermoplastic resin containing a cycloolefin polymer and an antistatic hard coat layer provided on the substrate film, the hard coat layer being formed of an antistatic hard coat agent containing electroconductive metal oxide fine particles, has a surface resistance value within a prescribed range and few streaks, and thus the present invention has been completed.

Accordingly, the present invention is as follows.

(1) An antistatic hard coat film comprising:
a substrate film formed of a thermoplastic resin containing a cycloolefin polymer; and
an antistatic hard coat layer provided on the substrate film, the antistatic hard coat layer containing electroconductive metal oxide fine particles, wherein
the antistatic hard coat layer has a surface resistance value of $1.0 \times 10^6$ Ω/sq. or more and $1.0 \times 10^{10}$ Ω/sq. or less, and
the number of streaks each having a length of 20 cm or longer of the antistatic hard coat layer is 2 or less per area of 1,330 mm×500 mm of the antistatic hard coat layer.

(2) The antistatic hard coat film according to (1), wherein
the antistatic hard coat layer is formed by applying a composition in which an antistatic hard coat agent containing the metal oxide fine particles is dissolved in a particle aggregation solvent and a particle dispersion solvent onto the substrate film, and
the composition has a viscosity of 1 mPa·s or more and 6 mPa·s or less.

(3) The antistatic hard coat film according to (1) or (2), wherein the metal oxide fine particles are antimony-doped tin oxide.

(4) The antistatic hard coat film according to any one of (1) to (3), wherein
the antistatic hard coat layer has a single-layer structure, and
the antistatic hard coat layer has a thickness of 10 μm or less.

(5) The antistatic hard coat film according to any one of (1) to (4), wherein
the substrate film is a diagonally stretched film, and
the substrate film has a thickness of 50 μm or less.

(6) A polarizing plate comprising the antistatic hard coat film according to any one of (1) to (5) and a polarizer, wherein the polarizer and the substrate film are bonded to each other.

(7) A touch panel comprising the polarizing plate according to (6) and a liquid crystal cell.

(8) The touch panel according to (7), wherein the liquid crystal cell is an IPS mode liquid crystal cell.

(9) The touch panel according to (7) or (8) comprising a cover glass on an outermost surface on a viewing side.

(10) A liquid crystal display device comprising the polarizing plate according to (6) and the liquid crystal cell.

(11) A method for producing the antistatic hard coat film according to any one of (1) to (5), the method comprising:

applying a composition in which an antistatic hard coat agent containing electroconductive metal oxide fine particles are dissolved in a particle aggregation solvent and a particle dispersion solvent onto the substrate film, to form an antistatic hard coat layer, wherein the composition has a viscosity of 1 mPa·s or more and 6 mPa·s or less.

Advantageous Effects of Invention

According to the present invention, there can be provided an antistatic hard coat film having few streaks and a surface resistance value within a prescribed range, and a production method thereof, as well as a polarizing plate, a touch panel, and a liquid crystal display device, each including such an antistatic hard coat film.

DESCRIPTION OF EMBODIMENTS

Figure 1:
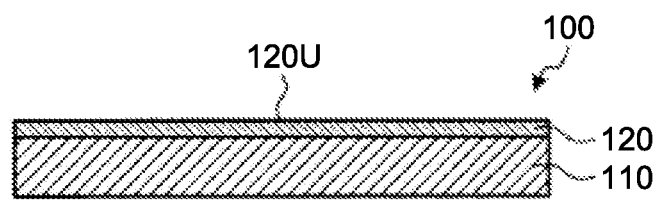
FIG. 1 is a cross-sectional view schematically illustrating an example of an antistatic hard coat film of the present invention.

Hereinafter, the present invention will be described in detail by way of embodiments and examples. However, the present invention is not limited to the following embodiments and examples and may be implemented with any modifications without departing from the scope of the claims of the present invention and equivalents thereto.

In the following description, a "long-length" film refers to a film having a length of at least 5 times or more the film width, and preferably having a length of 10 times or more the film width, and specifically refers to a film of a sufficient extent of length to be wound in a roll shape for storage or transportation. The upper limit of the ratio of the film length with respect to the film width is not particularly limited, although it may be set to, for example, 100,000 times or more.

In the following description, an in-plane retardation Re of a film is a value represented by Re=(nx−ny)×d, unless otherwise specified. Further, a thickness direction retardation Rth of a film is a value represented by Rth={(nx+ny)/2−nz}×d, unless otherwise specified. In the formulae, nx represents a refractive index in a direction in which the maximum refractive index is given among directions perpendicular to the thickness direction of the film (in-plane directions), ny represents a refractive index in a direction, among the above-mentioned in-plane directions, orthogonal to the direction giving nx, nz represents a refractive index in the thickness direction, and d represents the thickness of the film. The measurement wavelength is 550 nm unless otherwise specified.

In the following description, "(meth)acrylate" encompasses both "acrylate" and "methacrylate" and "(meth) acryloyl group" encompasses both "acryloyl group" and "methacryloyl group".

In the following description, a direction of an element being "parallel", "perpendicular", and "orthogonal" may allow an error within the range of not impairing the advantageous effects of the present invention, for example, within a range of ±5°, unless otherwise specified.

In the following description, a lengthwise direction of the long-length film is usually parallel to a flow direction of the film in a production line.

In the following description, "polarizing plate" and "¼ wave plate" include not only a rigid member, but also a flexible member, such as, for example, a resin film, unless otherwise specified.

In the following description, in a member including a plurality of films, an angle formed by optical axes of the respective films (a transmission axis of a polarizer, a slow axis of a phase difference film, etc.) is an angle viewed from the thickness direction of the films, unless otherwise specified.

In the following description, an adhesive encompasses not only an adhesive in a narrow sense (an adhesive having a shear storage modulus of between 1 MPa and 500 MPa at 23° C. after an energy ray irradiation or heat treatment), but also a pressure-sensitive adhesive having a shear storage modulus of less than 1 MPa at 23° C., unless otherwise specified.

In the following description, a slow axis of a film refers to an in-plane slow axis of the film, unless otherwise specified.

[1. Overview of Antistatic Hard Coat Film]

An antistatic hard coat film of the present invention includes a substrate film formed of a thermoplastic resin containing a cycloolefin polymer and an antistatic hard coat layer provided on the substrate film, the antistatic hard coat layer containing electroconductive metal oxide fine particles.

FIG. 1 is a cross-sectional view schematically illustrating an example of the antistatic hard coat film of the present invention.

As shown in FIG. 1, an antistatic hard coat film 100 of the present invention includes a substrate film 110 and an antistatic hard coat layer 120 provided on the substrate film 110. Further, the antistatic hard coat layer 120 has a surface resistance value within a prescribed range. Further, the number of streaks each having a length of 20 cm or longer per a prescribed region of the antistatic hard coat layer 120 of the present invention is 2 or less. The antistatic hard coat film 100 of the present invention having such a configuration has few streaks per a prescribed surface and has a surface resistance value within a prescribed range. In such a configuration, the antistatic hard coat layer 120 may be an outermost layer of the antistatic hard coat film 100 such that a surface 120U of the antistatic hard coat layer 120 is exposed. Alternatively, an optional layer may be provided on the antistatic hard coat layer 120. Further, the substrate film may be a multi-layer film having two or more layers.

[2. Substrate Film]

The substrate film used in the present invention is formed of a thermoplastic resin containing a cycloolefin polymer. The cycloolefin polymer has an alicyclic structure in its structural unit. The cycloolefin polymer may have the alicyclic structure in a main chain, and may have the alicyclic structure in a side chain. Of these, the polymer having the alicyclic structure in a main chain is preferable from the viewpoint of mechanical strength and heat resistance.

Examples of the alicyclic structure may include a saturated alicyclic hydrocarbon (cycloalkane) structure, and an unsaturated alicyclic hydrocarbon (cycloalkene and cycloalkyne) structure. Of these, a cycloalkane structure and a cycloalkene structure are preferable and a cycloalkane structure is more preferable from the viewpoint of, for example, mechanical strength, heat resistance, and the like.

The number of carbon atoms constituting the alicyclic structure is preferably 4 or more, and more preferably 5 or more, and is preferably 30 or less, more preferably 20 or less, and particularly preferably 15 or less, per one alicyclic structure. When the number of carbon atoms constituting the alicyclic structure falls within this range, the thermoplastic resin containing the polymer having the alicyclic structure exhibits mechanical strength, heat resistance, and moldability in a highly balanced manner.

In the cycloolefin polymer, the ratio of the structural unit having the alicyclic structure may be appropriately selected in accordance with a purpose of use. The ratio of the structural unit having the alicyclic structure in the cycloolefin polymer is preferably 55% by weight or more, further preferably 70% by weight or more, and particularly preferably 90% by weight or more. When the ratio of the structural unit having the alicyclic structure in the cycloolefin polymer falls within this range, transparency and heat resistance of the thermoplastic resin containing the cycloolefin polymer are improved.

Examples of the cycloolefin polymer may include a norbornene-based polymer, a monocyclic olefin-based polymer, a cyclic conjugated diene-based polymer, and hydrogenated products of these. Of these, a norbornene-based polymer is particularly preferable because of its favorable moldability. As the cycloolefin polymer, one type thereof may be solely used, and two or more types thereof may also be used in combination at any ratio.

Examples of the norbornene-based polymer may include resins described in Japanese Patent Application Laid-Open Nos. Hei. 3-14882 A, Hei. 3-122137 A, and Hei. 4-63807 A, and may specifically include a ring-opening polymer of a norbornene-based monomer and a hydrogenated product thereof, an addition polymer of a norbornene-based monomer, an addition polymer of a norbornene-based monomer and an olefin, and modified products of these polymers.

In the following description, a monomer having a norbornene structure may be referred to as a "norbornene-based monomer". Examples of the ring-opening polymer of the norbornene-based monomer may include a ring-opening homopolymer of one type of monomer having a norbornene structure, a ring-opening copolymer of two or more types of monomers having a norbornene structure, and a ring-opening copolymer of a monomer having a norbornene structure and another monomer copolymerizable therewith. Further, examples of the addition polymer of the norbornene-based monomer may include an addition homopolymer of one type of monomer having a norbornene structure, an addition copolymer of two or more types of monomer having a norbornene structure, and an addition copolymer of a monomer having a norbornene structure and another monomer copolymerizable therewith. Of these, a hydrogenated product of the ring-opening polymer of the norbornene-based monomer is particularly preferable from the viewpoint of moldability, heat resistance, low hygroscopicity, size stability, lightweight property, and the like.

Examples of the norbornene-based monomer may include norbornene, an alkyl-substituted derivative of norbornene, an alkylidene-substituted derivative of norbornene, an aromatic-substituted derivative of norbornene, and these substituted or unsubstituted norbornene-based monomers in which a part of olefin is substituted with a polar group such as a halogen, a hydroxyl group, an ester group, an alkoxy group, a cyano group, an amide group, an imide group, and a silyl group. Specific examples of such a norbornene-based monomer may include 2-norbornene, 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl-5-methyl-2-norbornene, 5-hexyl-2-norbornene, 5-octyl-2-norbornene, and 5-octadecyl-2-norbornene.

Examples of the norbornene-based monomer may further include a monomer in which one or more cyclopentadienes are added to the norbornene; an alkyl-substituted derivative of this monomer; an alkylidene-substituted derivative of this monomer; an aromatic-substituted derivative of this monomer; and polar group-substituted products of these. Specific examples of such a norbornene-based monomer may include 1,4:5,8-dimethano-1,2,3,4,4a,5,8,8a-2,3-cyclopentadienooctahydronaphthalene, 6-methyl-1,4:5,8-dimethano-1,4,4a,5,6,7,8,8a-octahydronaphthalene, and 1,4:5,10:6,9-trimethano-1,2,3,4,4a,5,5a,6,9,9a,10,10a-dodecahydro-2,3-cyclopentadienoanthracene.

Examples of the norbornene-based monomer may further include a monomer having a polycyclic structure, which is a multimer of cyclopentadiene; an alkyl-substituted derivative of this monomer; an alkylidene-substituted derivative of this monomer; an aromatic-substituted derivative of this monomer; and polar group-substituted products of these. Specific examples of such a norbornene-based monomer may include dicyclopentadiene, and 2,3-dihydrodicyclopentadiene.

Examples of the norbornene-based monomer may further include an adduct of cyclopentadiene and tetrahydroindene; an alkyl-substituted derivative of this adduct; an alkylidene-substituted derivative of this adduct; an aromatic-substituted derivative of this adduct; and polar group-substituted products of these. Specific examples of such a norbornene-based monomer may include 1,4-methano-1,4,4a,4b,5,8,8a,9a-octahydrofluorene, and 5,8-methano-1,2,3,4,4a,5,8,8a-octahydro-2,3-cyclopentadienonaphthalene.

As the monomer having a norbornene structure, one type thereof may be solely used, and two or more types thereof may also be used in combination at any ratio.

Among the norbornene-based polymer, preferable are the polymers having an X: bicyclo[3.3.0]octane-2,4-diyl-ethylene structure and a Y: tricyclo[4.3.0.1$^{2,5}$]decane-7,9-diyl-ethylene structure as a structural unit, wherein the content of these structural units is 90% by weight or more with respect to the entire structural unit content of the norbornene-based polymer and a content ratio of X and Y is between 100:0 and 40:60 in terms of a weight ratio of X and Y. By using such a polymer, a substrate film that can exhibit excellent stability in optical characteristics without having a size change over a long period of time can be obtained.

Examples of a monomer having the X structure as a structural unit may include a norbornene-based monomer having a structure wherein a five-membered ring is bonded to a norbornene ring. Specific examples thereof may include tricycle[4.3.0.1$^{2,5}$]deca-3,7-diene (common name: dicyclopentadiene) and a derivative thereof (a derivative having a substituent in the ring), and 7,8-benzotricyclo[4.3.0.1$^{2,5}$]deca-3-ene (common name: methanotetrahydrofluorene) and a derivative thereof.

Further, examples of a monomer having the Y structure as a structural unit may include tetracyclo[4.4.0.1$^{2,5}$.1$^{7,10}$]deca-3,7-diene (common name: tetracyclododecene) and a derivative thereof (a derivative having a substituent in the ring).

Polymerization of the norbornene-based monomer may be performed by a publicly known method. The norbornene-based monomer may be optionally copolymerized with another monomer copolymerizable therewith and hydrogenated to produce a hydrogenated product of a thermoplastic norbornene-based polymer, which is a thermoplastic saturated norbornene-based resin. Further, the polymer and the hydrogenated product of the polymer may be modified using α,β-unsaturated carboxylic acid and/or a derivative thereof, a styrene-based hydrocarbon, an organosilicon compound having an olefinic unsaturated bond and a hydrolysable group, or an unsaturated epoxy monomer.

In the present invention, the number-average molecular weight of the cycloolefin polymer, which is measured as polystyrene-equivalent value by a gel permeation chromatography (GPC) method using toluene as a solvent, is 10,000 to 200,000, preferably 15,000 to 100,000, and more preferably 20,000 to 50,000. Further, if the cycloolefin polymer has an unsaturated bond in its molecular structure, the cycloolefin polymer may be hydrogenated to produce a cycloolefin polymer. When hydrogenation is performed, the hydrogenation rate is 90% or higher, preferably 95% or higher, and more preferably 99% or higher from the viewpoint of heat deterioration resistance, light deterioration resistance, and the like.

The content of the cycloolefin polymer in the thermoplastic resin containing the cycloolefin polymer is preferably 50% by weight to 100% by weight, and more preferably 70% by weight to 100% by weight. When the content of the cycloolefin polymer is confined within the above-mentioned range, a substrate film having desired properties can be easily obtained.

The thermoplastic resin containing the cycloolefin polymer used in the present invention may optionally include various additives, such as an aging preventing agent including, for example, a phenol-based and phosphorus-based aging preventing agents, a thermal deterioration preventing agent including, for example, a phenol-based thermal deterioration preventing agent, a ultraviolet absorber, and a lubricant including, for example, an ester of an aliphatic alcohol and a partial ester and a partial ether of a polyhydric alcohol. Further, the thermoplastic resin may include a polymer other than the cycloolefin polymer within the range of not impairing the purpose of the present invention.

If the substrate film is a multi-layer film having two or more layers, the substrate film preferably includes a first surface layer, an intermediate layer containing a ultraviolet absorber, and a second surface layer in this order in a thickness direction to form the multi-layer film. That is, the substrate film preferably includes the first surface layer formed of a thermoplastic resin containing the cycloolefin polymer, the intermediate layer formed of a thermoplastic resin containing the cycloolefin polymer and a ultraviolet absorber, and the second surface layer formed of a thermoplastic resin containing the cycloolefin polymer in this order in the thickness direction. The multi-layer film having such a configuration can suppress bleed-out of the ultraviolet absorber contained in the intermediate layer by the first surface layer and the second surface layer.

Examples of the ultraviolet absorber may include a triazine-based ultraviolet absorber, a benzophenone-based ultraviolet absorber, a benzotriazole-based ultraviolet absorber, and an acrylonitrile-based ultraviolet absorber. Of these, a triazine-based ultraviolet absorber is excellent in ultraviolet absorbing performance around 380 nm and is thus preferable. Two or more different types of the ultraviolet absorbers may be used. Alternatively only one type thereof may be solely used.

As an example of the triazine-based ultraviolet absorber, a compound having a 1,3,5-triazine ring may be preferably used. Specifically, 2-(4,6-diphenyl-1,3,5-triazine-2-yl)-5-[(hexyl)oxy]-phenol, 2,4-bis(2-hydroxy-4-butoxyphenyl)-6-(2,4-dibutoxyphenyl)-1,3,5-triazine, and the like are preferably used. As an example of a commercially available product of the triazine-based ultraviolet absorber, "TINUVIN 1577" (manufactured by Ciba Specialty Chemicals Corp.) may be mentioned.

Examples of the benzotriazole-based ultraviolet absorber may include 2,2'-methylenebis[4-(1,1,3,3-tetramethylbutyl)-6-(2H-benzotriazole-2-yl)phenol], 2-(3,5-di-tert-butyl-2-hydroxyphenyl)-5-chlorobenzotriazole, 2-(2H-benzotriazole-2-yl)-p-cresol, 2-(2H-benzotriazole-2-yl)-4,6-bis(1-methyl-1-phenylethyl)phenol, 2-benzotriazole-2-yl-4,6-di-tert-butylphenol, 2-[5-chloro(2H)-benzotriazole-2-yl]-4-methyl-6-(tert-butyl)phenol, 2-(2H-benzotriazole-2-yl)-4,6-di-tert-butylphenol, 2-(2H-benzotriazole-2-yl)-4-(1,1,3,3-tetramethylbutyl)phenol, 2-(2H-benzotriazole-2-yl)-4-methyl-6-(3,4,5,6-tetrahydrophthalimidylmethyl)phenol, a reaction product of methyl 3-(3-(2H-benzotriazole-2-yl)-5-tert-butyl-4-hydroxyphenyl)propionate and polyethylene glycol 300, and 2-(2H-benzotriazole-2-yl)-6-(linear and branched dodecyl)-4-methylphenol. As an example of a commercially available product of the triazole-based ultraviolet absorber, "ADK STAB LA-31" (manufactured by ADEKA Corp.) may be mentioned.

The content of the above-mentioned ultraviolet absorber in the thermoplastic resin containing the above-mentioned cycloolefin polymer is preferably 1 to 8% by weight, and more preferably 3 to 6% by weight. If a plurality of types of the ultraviolet absorbers are used, the content of the ultraviolet absorber described herein refers to the entire content of the ultraviolet absorbers. If the content of the ultraviolet absorber is less than the lower limit of the above-mentioned range, a light transmittance in a wavelength range of 200 nm to 370 nm increases. As a result, when a polarizing plate is provided with the antistatic hard coat film, the polarization degree of the polarizer thereof may decrease. On the other hand, if the content of the ultraviolet absorber exceeds the upper limit of the above-mentioned range, the light transmittance in a short wavelength side decreases. As a result, the antistatic hard coat film may become excessively yellowish. Thus, when the content of the ultraviolet absorber falls within the above-mentioned range, sufficient ultraviolet absorbing performance can be ensured, while deterioration of a color tone can be suppressed. Further, when the content of the ultraviolet absorber falls within the above-mentioned range, a reduction in heat resistance of the resin composition can be suppressed because an excessive amount of the ultraviolet absorber is not contained.

The glass transition temperature of the cycloolefin polymer used in the present invention is preferably 80° C. or higher, and more preferably 100 to 250° C.

In accordance with its purpose, the substrate film formed of the thermoplastic resin containing the cycloolefin polymer may be a film having an in-plane retardation of 10 nm or less and/or a thickness direction retardation value of −10 nm to 10 nm. The substrate film may also be a film having characteristics of a ¼ wave plate by having an in-plane retardation value of 120 to 150 nm and a thickness direction retardation value of 60 to 225 nm with visible transmitted light of 550 nm.

Fluctuation of the in-plane retardation (Re) and the thickness direction retardation (Rth) is preferably within 10 nm, more preferably within 5 nm, and particularly preferably within 2 nm. When the above-mentioned fluctuations of the in-plane retardation Re and the thickness direction retardation (Rth) fall within the above-mentioned ranges, display quality when the substrate film is used as a phase difference film for liquid crystal display device can be improved.

The thickness of the substrate film is preferably 10 μm or more, more preferably 20 μm or more, and particularly preferably 30 μm or more, and is preferably 50 μm or less, and more preferably 40 μm or less. When the thickness of the substrate film is confined within the above-mentioned range, it is possible to make the antistatic film thinner. If the substrate film is a multi-layer film having two or more layers, it is preferable that the total thickness of the layers is confined within the above-mentioned range.

[2.1. Method for Producing Substrate Film]

The substrate film may be produced by molding the thermoplastic resin containing the cycloolefin polymer into a film shape. Examples of the molding method for used may include a heat melting molding method and a solution casting method. Of these, a heat melting molding method is preferably used from the viewpoint of reducing a volatile component in the film. More specifically, the heat melting molding method may be further classified into, for example, a melt extrusion molding method, a press molding method, an inflation method, an injection molding method, a blow molding method, a stretch molding method, and the like. Of these, the melt extrusion molding method is preferably used to obtain the substrate film excellent in mechanical strength, surface precision, and the like.

Further, if the substrate film is a multi-layer film having two or more layers, a co-extrusion method is preferably used.

The molding conditions may be appropriately selected in accordance with a purpose of use and the molding method. When the melt extrusion molding method is used, the cylinder temperature is appropriately set in a range of preferably 100° C. to 600° C., and more preferably 150° C. to 350° C.

The thickness of a pre-stretch film may be appropriately determined in accordance with a purpose of use or the like of the stretched film to be obtained. The thickness of the pre-stretch film is preferably 30 μm or more and 300 μm or less from the viewpoint of obtaining a uniform stretched film by a stable stretching treatment.

The method for producing the substrate film preferably includes a step of subjecting the film obtained by the above-mentioned molding method to a stretching treatment. By subjecting the film to the stretching treatment, optical characteristics such as retardation can be given to the substrate film.

The stretching treatment may be performed by any method in accordance with retardation desired to be developed on the substrate film. For example, the stretching treatment may be performed by a uniaxial stretching treatment in which stretching is performed in one direction or by a biaxial stretching treatment in which stretching is performed in two different directions. Further, the biaxial stretching treatment may be performed by a simultaneous biaxial stretching treatment in which stretching is performed in two directions at the same time or a sequential biaxial stretching treatment in which stretching is first performed in one direction and then in another direction. Further, the stretching treatment may be performed by any one of the followings: a longitudinal stretching treatment in which stretching is performed in a lengthwise direction of the film; a transverse stretching treatment in which stretching is performed in a width direction of the film; a diagonal stretching treatment in which stretching is performed in a diagonal direction that is neither parallel nor perpendicular to the width direction of the film; and a combination of these. Of these, in the present invention, the substrate film for use is preferably the one which has been subjected to the diagonal stretching treatment. Examples of a method for performing the stretching treatment may include a roll method, a float method, and a tenter method.

The temperature at which the pre-stretch film is subjected to the diagonal stretching treatment is within a temperature range of preferably between Tg−30° C. and Tg+60° C., and more preferably between Tg−10° C. and Tg+50°, where Tg represents a glass transition temperature of the thermoplastic resin containing the cycloolefin polymer. Further, the stretching ratio is usually 1.01 to 30 times, preferably 1.01 to 10 times, and more preferably 1.01 to 5 times.

The average thickness of the stretched film is preferably 20 μm or more and 250 μm or less, and further preferably 23 μm or more and 188 μm or less, from the viewpoint of mechanical strength and the like. Further, thickness unevenness of the stretched film in the width direction is preferably 3 μm or less, and more preferably 2 μm or less, so as not to interfere a roll up operation.

If the substrate film is a film that is capable of functioning as a ¼ wave plate, the glass transition temperature (Tg) of the thermoplastic resin containing the cycloolefin polymer is preferably 120° C. or higher, more preferably 130° C. or higher, and particularly preferably 150° C. or higher. If the Tg of the resin is too low, heat resistance of a molded product decreases. The upper limit of the Tg in such a case is not particularly limited, but it may be, for example, 200° C. or lower.

Further, considering the antistatic hard coat layer forming process and the touch panel producing step, the thermoplastic resin for use preferably has the glass transition temperature (Tg) of 120° C. or higher and a photoelastic coefficient of $10 \times 10^{-10} \cdot Pa^{-1}$ or less. If the Tg is lower than 120° C., deformation or wrinkles on the substrate film may occur due to a stress upon the step of drying a composition in which the antistatic hard coat agent is dissolved, or upon performing active energy-ray curing, or due to a temperature for laminating an electroconductive layer, and the like. Further, if the photoelastic coefficient exceeds $10 \times 10^{-10} \cdot Pa^{-1}$, the in-plane and thickness direction retardation values are easily changed by a tensile stress of bonding or the like. As a result, optical isotropy may be partially impaired. The upper limit of the Tg in the above-mentioned case is not particularly limited, but it may be, for example, 200° C. or lower. Further, the lower limit of the photoelastic coefficient in the above-mentioned case is not particularly limited, but it may be, for example, $10 \times 10^{-13}$ or more.

Further, the substrate film may be the one that has been subjected to a surface treatment for the purpose of improving adhesiveness to the antistatic hard coat layer. Examples of the surface treatment may include a plasma treatment, a corona treatment, an alkali treatment, and a coating treatment. In particular, employment of the corona treatment can increase adhesion strength between the substrate film and the antistatic hard coat layer.

As the conditions for the corona treatment, an irradiation amount of electrons produced by corona discharge is preferably 1 to 1,000 W/m²/min. After the corona treatment described above, a contact angle of the substrate film with respect to water is preferably 10 to 50°. Further, the substrate film may be subjected to application of the composition in which the antistatic hard coat agent is dissolved right after the corona treatment, or may be subjected to application of the composition in which the antistatic hard coat agent is dissolved after being destaticized. The substrate film is preferably subjected to application of the composition in which the antistatic hard coat agent is dissolved after being destaticized from the viewpoint of improving the appearance of the antistatic hard coat layer.

[3. Antistatic Hard Coat Layer]

The antistatic hard coat layer is provided on the substrate film, and includes electroconductive metal oxide fine particles. In this configuration, the antistatic hard coat layer may be provided indirectly on the substrate film via an optional layer. However, the antistatic hard coat layer is usually provided directly on the surface of the substrate film. In the antistatic hard coat layer, the metal oxide fine particles are aggregated so as to be coupled together in a chain form, resulting in the formation of a chain-coupled body. Such a chain-coupled body forms an electroconductive path. Thus, the antistatic hard coat film of the present invention can exhibit an antistatic function.

[3.1. Metal Oxide Fine Particles]

A metal oxide as a material of the metal oxide fine particles is not particularly limited, and any electroconductive metal oxide may be appropriately selected for use. Examples of the metal oxide may include tin oxide, tin oxide doped with antimony, fluorine or phosphorus, indium oxide, indium oxide doped with tin or fluorine, antimony oxide, and a low valence titanium oxide. In particular, tin oxide doped with antimony (antimony-doped tin oxide) and indium oxide doped with antimony are preferable, and tin oxide doped with antimony is more preferable. One type thereof may be solely used, and two or more types thereof may also be used in combination at any ratio.

The average particle diameter of the metal oxide fine particles is preferably 2 nm to 50 nm, more preferably 4 nm to 40 nm, and particularly preferably 5 nm to 10 nm. Further, it is preferable that 2 to 10 of these metal oxide fine particles are coupled together in a chain form. When the metal oxide fine particles have the average particle diameter of 2 nm or more, the electroconductive metal oxide fine particles can be prevented from being aggregated into a granular form, thus it becomes possible to obtain the electroconductive metal oxide fine particles in a chain form. When the metal oxide fine particles have the average particle diameter of 50 nm or less, the resulting coating film obtained using such metal oxide fine particles has improved transparency and reduced haze. Further, such a particle diameter facilitates the coupling of the metal oxide fine particles, and thus the metal oxide fine particles in a chain form can be obtained.

The average particle diameter of particles described herein refers to a particle diameter at which scattering intensity becomes maximum, assuming that a particle diameter distribution measured with a laser diffraction method exhibits a normal distribution.

Further, it is preferable that the surface of the metal oxide fine particles is a surface that has been treated with a hydrolysable organosilicon compound. When the metal oxide fine particles are subjected to such a treatment, the surface of the particles themselves formed of the metal oxide is usually modified by a hydrolysate of the organosilicon compound. Thus, hereinafter, the surface treatment of the metal oxide fine particles by the hydrolysable organosilicon compound may be referred to as a "modification treatment". Further, the metal oxide fine particles of which surface is treated by the hydrolysable organosilicon compound may be referred to as "modified particles". By performing such a modification treatment, it is possible to strengthen the coupling of the metal oxide fine particles in a chain form and improve dispersibility of the metal oxide fine particles.

Examples of the hydrolysable organosilicon compound may include an organosilicon compound represented by the following formula (1).

$$R^1_a Si(OR^2)_{4-a} \quad (1)$$

(In the formula (1), $R^1$ and $R^2$ independently represent a group selected from the group consisting of a hydrogen atom, a halogen atom, a hydrocarbon group of 1 to 10 carbon atoms, and an organic group of 1 to 10 carbon atoms, and "a" represents an integer of 0 to 3.)

In the formula (1), examples of $R^1$ may include a vinyl group, an acrylic group, and an alkyl group of 1 to 8 carbon atoms.

Further, in the formula (1), examples of $R^2$ may include a hydrogen atom, a vinyl group, an aryl group, an acrylic group, an alkyl group of 1 to 8 carbon atoms, and —$CH_2OC_nH_{2n+1}$ (n represents an integer of 1 to 4).

The organosilicon compound represented by the formula (1) is preferably an organosilicon compound where "a" is 0 or 1. A tetrafunctional organosilicon compound represented by the formula (1) where "a" is 0 is effective in maintaining the coupling of the metal oxide fine particles. Further, a trifunctional organosilicon compound represented by the formula (1) where "a" is 1 is effective in improving dispersibility of the metal oxide fine particles coupled in a chain form in the composition in which the antistatic hard coat agent is dissolved in a solvent. Further, a trifunctional or higher-functional organosilicon compound represented by the formula (1) where "a" is 0 or 1 usually undergoes hydrolysis at a high rate.

Further, the organosilicon compound represented by the formula (1) is preferably a combination of the tetrafunctional organosilicon compound where "a" is 0 and the trifunctional organosilicon compound where "a" is 1. When these organosilicon compounds are used in combination, the molar ratio of the tetrafunctional organosilicon compound with respect to the trifunctional organosilicon compound (tetrafunctional organosilicon compound/trifunctional organosilicon compound) is preferably 20/80 or higher, and more preferably 30/70 or higher, and is preferably 80/20 or lower, and more preferably 70/30 or lower. When the amount of the tetrafunctional organosilicon compound is controlled not to be excessive, aggregation of the metal oxide fine particles into a cluster can be suppressed, and coupling of the metal oxide fine particles in a chain form can thereby be facilitated. Further, when the amount of the trifunctional organosilicon compound is controlled not to be excessive, a gel formation during the coupling of the metal oxide fine particles can be suppressed. Thus, when the tetrafunctional organosilicon compound and the trifunctional organosilicon compound represented by the formula (1) are combined in the molar ratio described above, the metal oxide fine particles can be efficiently coupled in a chain form.

As described above, when the tetrafunctional organosilicon compound and the trifunctional organosilicon compound are used in combination as the organosilicon compound represented by the formula (1), it is possible to strongly couple the metal oxide fine particles together in a chain form. The reason why this effect is provided is not clear, but it is speculated as follows. Coupling sites of the metal oxide fine particles are highly active, and thus the tetrafunctional organosilicon compound where "a" is 0 are easily absorbed to the coupling sites of the metal oxide fine particles. Further, the tetrafunctional organosilicon compound, which is easily hydrolysable, undergoes hydrolysis simultaneously with mixing with an alcohol to generate a large amount of Si—OH bonds. On the other hand, the trifunctional organosilicon compound where "a" is 1, which has low solubility in water, is dissolved in water by mixing with an alcohol and then undergoes hydrolysis. It is speculated that therefore the tetrafunctional organosilicon compound is first absorbed to the coupling sites of the metal oxide fine particles and undergo hydrolysis to produce the Si—OH bonds, and then the trifunctional organosilicon compound reacts with such Si—OH bonds.

Therefore, it is preferable that, when the tetrafunctional organosilicon compound and the trifunctional organosilicon compound are used in combination, the tetrafunctional organosilicon compound is first mixed with an aqueous dispersion of the metal oxide fine particles and then mixed with the alcohol and the trifunctional organosilicon compound, rather than mixing these organosilicon compounds simultaneously with the aqueous dispersion of the metal oxide fine particles.

Examples of the hydrolysable organosilicon compound may include tetraalkoxysilanes such as tetramethoxysilane and tetraethoxysilane, trialkoxysilanes or triacyloxysilanes such as methyltrimethoxysilane, methyltriethoxysilane, methyltriacetoxysilane, methyltripropoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, γ-glycidoxypropyltrimethoxysilane, γ-glycidoxypropyltriethoxysilane, γ-(β-glycidoxyethoxy)propyltrimethoxysilane, γ-methacryloxypropyltrimethoxysilane, γ-aminopropyltrimethoxysilane, and γ-mercaptopropyltriethoxysilane, dialkoxysilanes and diacylsilanes such as dimethyldimethoxysilane, dimethyldiethoxysilane, phenylmethyldiethoxysilane, γ-glycidoxypropylmethyldimethoxysilane, γ-glycidoxypropylphenyldiethoxysilane, γ-chloropropylmethyldimethoxysilane, dimethyldiacetoxysilane, γ-methacryloxypropylmethyldimethoxysilane, γ-mercaptopropylmethyldimethoxysilane, and γ-aminopropylmethyldimethoxysilane, and trimethylchlorosilane. One type thereof may be solely used, and two or more types thereof may also be used in combination at any ratio.

Subsequently, a method for producing the modified particles (the metal oxide fine particles of which the surface is treated with the hydrolysable organosilicon compound) will be described. In the production method described below, the modified particles are produced in a form of dispersion.

In the method for producing the modified particles, an aqueous dispersion of the metal oxide fine particles to be treated is prepared. In this preparation, the concentration of the metal oxide fine particles in the aqueous dispersion is preferably 1% by weight or more, and more preferably 10% by weight or more, and is preferably 40% by weight or less.

Subsequently, pH of the above-mentioned aqueous dispersion is adjusted to, preferably 2 or higher, more preferably 2.5 or higher, and preferably 4 or lower. When the pH of the aqueous dispersion is equal to or higher than the lower limit value of the above-mentioned range, aggregation of the metal oxide fine particles in a spherical form can be suppressed, and coupling of the metal oxide fine particles in a chain form can thereby be facilitated. Further, when the pH is equal to or lower than the upper limit value, the coupling number of the metal oxide fine particles being coupled in a chain form can be easily increased. Thus, the average coupling number of the metal oxide fine particles can be easily increased to a number as large as 2 or more, and thus the antistatic performance of the antistatic hard coat film can be easily improved.

Examples of the method for adjusting the pH may include an ion exchange treatment method using an ion exchange resin and a method of mixing an acid. The ion exchange resin is preferably an H-type cation exchange resin. The pH of the aqueous dispersion can be usually shifted to an acidic range by the ion exchange treatment. Further, if the pH is not sufficiently lowered only by the ion exchange resin treatment, an acid may be mixed to the aqueous dispersion as necessary.

Further, the ion exchange treatment usually results in a deionizing treatment, and thus the metal oxide fine particles are easily aligned in a chain form.

After adjusting the pH, the solid content concentration of the aqueous dispersion is preferably adjusted in an appropriate range by concentrating or diluting the aqueous dispersion of the metal oxide fine particles. Specifically, the solid content concentration of the aqueous dispersion after the pH adjustment is adjusted to, preferably 10% by weight or more, and more preferably 15% by weight or more, and preferably 40% by weight or less, and more preferably 35% by weight or less. When the solid content concentration of the aqueous dispersion of the metal oxide fine particles is equal to or more than the lower limit value of the above-mentioned range, the coupling of the metal oxide fine particles in a chain form can be facilitated. Thus, the average coupling number of the metal oxide fine particles can be easily increased to a number as large as 3 or more. As a result, the antistatic performance of the antistatic hard coat film can be easily improved. Further, when the solid content concentration is equal to or less than the upper limit value, viscosity of the aqueous dispersion of the metal oxide fine particles can be lowered, and thus mixing by stirring can sufficiently progress. As a result, the hydrolysable organosilicon compounds can be uniformly absorbed to the metal oxide fine particles.

Subsequently, the aqueous dispersion of the metal oxide fine particles prepared as described above and the hydrolysable organosilicon compounds are mixed together. Examples of the hydrolysable organosilicon compound may include the compound represented by the above-mentioned formula (1).

The amount of the hydrolysable organosilicon compound may be appropriately set in accordance with factors such as a type of the organosilicon compound and a particle diameter of the metal oxide fine particles. The weight ratio of the hydrolysable organosilicon compound with respect to the metal oxide fine particles (hydrolysable organosilicon compound/metal oxide fine particles) is preferably 0.01 or higher, and more preferably 0.02 or higher, and is preferably 0.5 or lower, and more preferably 0.3 or lower. If two or more types of the organosilicon compounds are used, it is preferable that the total amount of the organosilicon compounds satisfies the weight ratio range described above. When the above-mentioned weight ratio is equal to or more than the lower limit value of the above-mentioned range, cleavage of the coupling of the metal oxide fine particles coupled in a chain form in the composition in which the antistatic hard coat agent is dissolved can be suppressed, and thus an antistatic hard coat film having an excellent antistatic function can be obtained. Further, having such a weight ratio can, for example, improve dispersibility of the metal oxide fine particles in the composition in which the antistatic hard coat agent is dissolved, reduce viscosity of the composition in which the antistatic hard coat agent is dissolved, and improve temporal stability of the composition in which the antistatic hard coat agent is dissolved. Thus haze of the antistatic hard coat layer can be reduced. Further, when the weight ratio is equal to or less than the upper limit value of the above-mentioned range, the layer of hydrolysates of the organosilicon compounds that modify the surface of the metal oxide fine particles can be prevented from becoming too thick, and thus a surface resistance value of the antistatic hard coat layer can be reduced.

Further, the method for producing the modified particles described herein includes a step of hydrolyzing the hydrolysable organosilicon compounds by mixing the aqueous dispersion of the metal oxide fine particles with an alcohol. This step is usually performed after a step of mixing the aqueous dispersion of the metal oxide fine particles with the hydrolysable organosilicon compounds. However, as described above, when the tetrafunctional organosilicon compound and the trifunctional organosilicon compound are used in combination, it is preferable that the tetrafunctional organosilicon compound is first mixed with the aqueous dispersion of the metal oxide fine particles, then this aqueous dispersion is mixed with the alcohol, and, at the same time of or after mixing the aqueous dispersion of the metal oxide fine particles with the alcohol, the trifunctional organosilicon compound is mixed with the aqueous dispersion of the metal oxide fine particles.

Examples of the alcohol may include methyl alcohol, ethyl alcohol, normal-propyl alcohol, isopropyl alcohol, and butanol. As the alcohol, one type thereof may be solely used, and two or more types thereof may also be used in combination at any ratio. Further, in combination with the above-mentioned alcohols, an organic solvent such as ethylene glycol monomethyl ether, ethylene glycol monoethyl ether, ethylene glycol monobutyl ether, propylene glycol monomethyl ether, and propylene glycol monoethyl ether may be used.

The amount of the alcohol is preferably adjusted so that the solid content concentration of the aqueous dispersion of the metal oxide fine particles after being mixed with the alcohol (a total solid content including the organosilicon compounds, where the content of the organosilicon compounds is calculated as silica-equivalent) is confined within a desired range. The desired range of the solid content concentration of the aqueous dispersion described herein is preferably 3% by weight or more, and more preferably 5% by weight or more, and is preferably 30% by weight or less, and more preferably 25% by weight or less.

The temperature of the hydrolysis is preferably 30° C. or higher, and more preferably 40° C. or higher. The upper limit of the temperature of the hydrolysis is usually a boiling point of the solvent used (about 100° C.) or lower. When the temperature of the hydrolysis is equal to or higher than the above-mentioned lower limit value, time required for the hydrolysis can be shortened and the remaining amount of the hydrolysable organosilicon compounds can be reduced. Further, when the temperature is equal to or lower than the upper limit value, stability of the obtained modified particles can be improved, and thus the excessive aggregation of the particles can be suppressed.

Further, an acid may be mixed with the aqueous dispersion of the metal oxide fine particles as a hydrolysis catalyst as necessary. Examples of the acid may include hydrochloric acid, nitric acid, acetic acid, and phosphoric acid. As the acid, one type thereof may be solely used, and two or more types thereof may also be used in combination at any ratio.

A specific example of preferable operations for hydrolyzing the organosilicon compounds is as follows.

First, the tetrafunctional organosilicon compound represented by the formula (1) where "a" is 0 is mixed with the aqueous dispersion of the metal oxide fine particles and then the resulting aqueous dispersion is mixed with the alcohol to induce the hydrolysis of the tetrafunctional organosilicon compound. Subsequently, the aqueous dispersion is cooled to the room temperature and again mixed with the above-mentioned alcohol as necessary. Subsequently, the trifunctional organosilicon compound represented by the formula (1) where "a" is 1 is mixed with the above-mentioned aqueous dispersion, and the resulting mixture is heated to the above-mentioned temperature suitable for the hydrolysis to induce the hydrolysis. Thus, the coupling of the metal oxide fine particles in a chain form can be maintained by hydrolysates of the tetrafunctional organosilicon compound. Further, binding of the hydrolysates of the trifunctional organosilicon compound to the surfaces of the metal oxide fine particles is facilitated, and this can improve dispersibility of the metal oxide fine particles.

As described above, the modified particles can be obtained by hydrolyzing the organosilicon compounds and modifying the surfaces of the metal oxide fine particles with the hydrolysates of the organosilicon compounds. Immediately after the hydrolysis, the above-mentioned modified particles are obtained in a form of dispersion in which the modified particles are dispersed in a solvent such as water. Such a dispersion of the modified particles as it is may be used for preparing the composition in which the antistatic hard coat agent is dissolved, although the dispersion of the modified particles may be subjected to a washing treatment or a deionizing treatment as necessary. By reducing an ion concentration by the deionizing treatment, a dispersion of the modified particles having excellent can be obtained. The deionizing treatment may be performed by using an ion exchange resin such as, for example, a cation exchange resin, an anion exchange resin, and an amphoteric ion exchange resin. Further, as the washing treatment, an ultrafiltration membrane method may be used.

Further, the dispersion of the modified particles thus obtained may be used after being subjected to solvent displacement as necessary. Performing of the solvent displacement improves dispersibility in the binder polymer and the polar solvent that will be described below. Thus, application properties of the composition in which the antistatic hard coat agent is dissolved in the solvent can be improved. This can, for example, improve surface smoothness of the antistatic hard coat layer and suppress the occurrence of appearance defects such as streaks and unevenness of the antistatic hard coat layer. Further, this can, for example, improve scratch resistance, transparency, and adhesiveness of the antistatic hard coat layer and reduce the haze thereof. Moreover, production reliability of the antistatic hard coat film can be improved.

The dispersion of the modified particles thus obtained may be mixed with water for use as necessary. Mixing with water usually increases the coupling number of the modified particles, which improves conductivity of the resulting antistatic hard coat layer.

The electroconductive metal oxide fine particles (including the modified particles) described above are usually coupled in a chain form in the dispersion or antistatic hard coat agent containing the metal oxide fine particles. Further, such a coupling structure is also maintained in the antistatic hard coat layer, and thus the coupled metal oxide fine particles form an electroconductive path in the antistatic hard coat layer. It is speculated that the antistatic hard coat layer can thereby exhibit excellent antistatic properties. Further, the metal oxide fine particles are not aggregated into a granular form, but aggregated so as to be coupled in a chain form, and thus the metal oxide fine particles are not likely to form a large aggregated mass that can cause scattering of visible light. It is speculated that, the haze can thereby be reduced in the antistatic hard coat layer containing such metal oxide fine particles. However, the present invention is not limited by the above-mentioned speculations.

The average coupling number of the metal oxide fine particles is preferably 2 or more, more preferably 3 or more, and particularly preferably 5 or more. When the average coupling number of the metal oxide fine particles is equal to or more than the above-mentioned lower limit value, antistatic performance of the antistatic hard coat layer can be enhanced. The upper limit of the average coupling number of the metal oxide fine particles is preferably 20 or less, and more preferably 10 or less. When the average coupling number of the metal oxide fine particles is equal to or less than the above-mentioned upper limit value, production of the metal oxide fine particles coupled in a chain form can be facilitated.

The average coupling number of the metal oxide fine particles described herein may be measured by the following method.

A photograph of the chain-coupled bodies of the metal oxide fine particles is taken with a transmission type electron microscope. From the obtained photographic image, the coupling number of each chain-coupled body is determined for a total of 100 chain-coupled bodies of the metal oxide fine particles. Then, an average value of the coupling number of each chain-coupled body is calculated and rounded off at the first decimal place to obtain the average coupling number of the metal oxide fine particles.

The amount of the metal oxide fine particles in the antistatic hard coat layer is preferably 3% by weight or more, more preferably 5% by weight or more, and particularly preferably 10% by weight or more, and is preferably 80% by weight or less, more preferably 70% by weight or less, and particularly preferably 50% by weight or less. When the amount of the metal oxide fine particles is equal to or more than the lower limit value of the above-mentioned range, surface resistance value of the antistatic hard coat layer can be reduced and thus antistatic performance can be improved. Further, when the amount of the metal oxide fine particles is equal to or less than the upper limit value, haze of the antistatic hard coat layer can be reduced. Thus, transparency of the antistatic hard coat film can be improved.

[3.2. Binder Polymer]

The antistatic hard coat layer usually includes a binder polymer in addition to the metal oxide fine particles. The binder polymer can hold the metal oxide fine particles in the antistatic hard coat layer.

The binder polymer is preferably a polymer obtained by polymerizing a polymerizable monomer containing 50% by weight or more of a compound having 3 or more (meth) acryloyl groups per molecule. Use of such a polymer as the binder polymer can effectively reduce the surface resistance value of the antistatic hard coat layer.

Examples of the compound having 3 or more (meth) acryloyl groups per molecule may include pentaerythritol tri(meth)acrylate, pentaerythritol tetra(meth)acrylate, dipentaerythritol tetra(meth)acrylate, dipentaerythritol penta(meth)acrylate, and dipentaerythritol hexa(meth)acrylate.

Further, as the compound having 3 or more (meth)acryloyl groups per molecule, one type thereof may be solely used, and two or more types thereof may also be used in combination at any ratio. For example, a combination of pentaerythritol tri(meth)acrylate and pentaerythritol tetra (meth)acrylate, and a combination of dipentaerythritol tetra (meth)acrylate, dipentaerythritol penta(meth)acrylate, and dipentaerythritol hexa(meth)acrylate may be used as the polymerizable monomer for obtaining the binder polymer.

Among the polymerizable monomers described above, preferable for use are the polymerizable monomer that contains a compound having 4 (meth)acryloyl groups per molecule, a compound having 5 (meth)acryloyl groups per molecule, and a compound having 6 (meth)acryloyl groups per molecule in a total amount of 80% by weight or more.

Further, as the polymerizable monomer for obtaining the binder polymer, an optional monomer compound may be used in combination with the above-mentioned compounds having 3 or more (meth)acryloyl groups per molecule. Examples of such an optional monomer compound may include trifunctional or tetrafunctional (meth)acrylates such as trimethylolpropane tri(meth)acrylate, pentaerythritol tri (meth)acrylate, and pentaerythritol tetra(meth)acrylate; isocyanates such as isophorone diisocyanate; polyfunctional unsaturated monomers such as ethylene glycol diacrylate, ethylene glycol dimethacrylate, diethylene glycol dimethacrylate, allyl methacrylate, diallyl phthalate, trimethylolpropane triacrylate, glycerin diallyl ether, polyethylene glycol dimethacrylate, and polyethylene glycol diacrylate; compounds having an aromatic ring and a (meth)acryloyl group, such as bis-phenoxyethanol fluorene diacrylate, 2-propenoic acid[5,5'-(9-fluorene-9-ylidene)bis(1,1'-biphenyl)-2-(polyoxyethylene) ester], and 2-propenoic acid[5,5'-4-(1,1'biphenylyl)methylenebis(1,1'-biphenyl)-2-(polyoxyethylene) ester]; and acrylic unsaturated monomers of alkyl (meth)acrylates of 1 to 30 carbon atoms, such as methyl (meth)acrylate, ethyl (meth)acrylate, butyl (meth)acrylate, hexyl (meth)acrylate, cyclohexyl (meth)acrylate, 2-ethylhexyl (meth)acrylate, octyl (meth)acrylate, nonyl (meth) acrylate, lauryl (meth)acrylate, and stearyl (meth)acrylate. One type thereof may be solely used, and two or more types thereof may also be used in combination at any ratio.

Further, as the optional monomer compound, a compound having a carboxyl group and a polymerizable carbon-carbon double bond is preferably used in an amount of 0.01% by weight to 5% by weight with respect to the total amount of the polymerizable monomers, because surface resistance value of the antistatic hard coat layer can thereby be effectively reduced. Examples of the above-mentioned compound having a carboxyl group and a polymerizable carbon-carbon double bond may include acrylic acid; methacrylic acid; crotonic acid; fumaric acid; itaconic acid; muconic acid; a half ester of maleic anhydride and a mono alcohol; a compound in which a part of hydroxyl groups of an acrylate having a hydroxyl group, such as dipentaerythritol pentaacrylate and pentaerythritol triacrylate, are added to carbon-carbon double bonds of acrylic acid; and a compound obtained by reacting a hydroxyl group of an acrylate having a hydroxyl group, such as dipentaerythritol pentaacrylate and pentaerythritol triacrylate, with dicarboxylic acid or carboxylic acid anhydride. One type thereof may be solely used, and two or more types thereof may also be used in combination at any ratio.

The acid value of the polymerizable monomer containing 50% by weight or more of the compound having 3 or more (meth)acryloyl groups per molecule is preferably 0.01 mgKOH/g to 0.5 mgKOH/g. When the acid value of the polymerizable monomer for obtaining the binder polymer is equal to or more than the lower limit value of the above-mentioned range, surface resistance value of the antistatic layer can be effectively reduced. Further, when the acid value is equal to or less than the upper limit value, stability of the composition in which the antistatic hard coat agent is dissolved can be improved.

The acid value of the polymerizable monomer may be measured using bromthymol blue as an indicator in accordance with JIS K0070 (Test methods for acid value, saponification value, ester value, iodine value, hydroxyl value and unsaponifiable matter of chemical products).

The amount of the binder polymer in the antistatic hard coat layer is preferably 10% by weight or more, more preferably 15% by weight or more, particularly preferably 20% by weight or more, and most preferably 50% by weight or more, and is preferably 100% by weight or less, more preferably 95% by weight or less, and particularly preferably 90% by weight or less. When the amount of the binder polymer falls within the above-mentioned range, adhesiveness of the antistatic hard coat layer to the substrate film can be enhanced, and dispersibility of the metal oxide fine particles in the antistatic hard coat layer can be improved. Further, thickness of the antistatic hard coat layer can be made uniform.

[3.3. Optional Component]

The antistatic hard coat layer may include an optional component in addition to the metal oxide fine particles and the binder polymer, so long as the advantageous effects of the present invention are not significantly impaired. As the optional component, one type thereof may be solely used, and two or more types thereof may also be used in combination at any ratio.

[3.4. Method for Producing Antistatic Hard Coat Film]

The antistatic hard coat film may be produced by a production method including a step of applying a composition in which the antistatic hard coat agent containing the metal oxide fine particles is dissolved in a solvent (this may be simply referred to hereinafter as a "composition") onto the substrate film to form the antistatic hard coat layer. Further, the layer of the composition in which the antistatic hard coat agent is dissolved in the solvent is usually in a fluid form at the time of application, and thus a step of curing a coated film of the composition in which the antistatic hard coat agent is dissolved in the solvent is preferably performed after the composition is applied onto the substrate film. Hereinafter, as an example of the method for producing such an antistatic hard coat film, there is described a preferable method for producing the antistatic hard coat film including the antistatic hard coat layer containing, as the binder polymer, the polymer obtained by polymerizing the polymerizable monomer containing 50% by weight or more of the compound having 3 or more (meth)acryloyl groups per molecule.

In the method for producing the antistatic hard coat film described in the present example, the antistatic hard coat agent is first prepared. In the present example, the antistatic hard coat agent to be used includes the metal oxide fine particles and the polymerizable monomer for obtaining the binder polymer. Further, the polymerizable monomer to be used contains 50% by weight or more of the compound having 3 or more (meth)acryloyl groups per molecule. In the present specification, the composition containing the metal oxide fine particles and a material for obtaining the binder polymer (the polymerizable monomer, etc.) and the composition containing the metal oxide fine particles and the binder polymer are both referred to as the "antistatic hard coat agent".

The above-mentioned polymerizable monomer is usually capable of being polymerized by irradiation with active energy rays such as ultraviolet rays. Thus, the antistatic hard coat agent preferably includes a photopolymerization initiator. Examples of the photopolymerization initiator may include benzoin derivatives, benzyl ketals, α-hydroxy acetophenones, α-amino acetophenones, acyl phosphine oxides, and o-acyloximes. Further, examples of a commercially available photopolymerization initiator may include a combination of benzophenone/amine, a combination of Michler ketone/benzophenone, and a combination of thioxanthone/amine (trade name: IRGACURE, DAROCUR, etc., manufactured by Ciba-Geigy AG). As the photopolymerization initiator, one type thereof may be solely used, and two or more types thereof may also be used in combination at any ratio.

The amount of the photopolymerization initiator is preferably 1 part by weight or more, more preferably 2 parts by weight or more, and particularly preferably 2.5 parts by weight or more, and is preferably 20 parts by weight or less, more preferably 10 parts by weight or less, and particularly preferably 5 parts by weight or less, with respect to 100 parts by weight of the polymerizable monomer. When the amount of the photopolymerization initiator falls within the above-mentioned range, it is possible to efficiently promote the polymerization of the polymerizable monomer and to avoid excessive mixing of the photopolymerization initiator whereby yellowing and a change in film properties in the antistatic hard coat layer caused by unreacted photopolymerization initiator can be suppressed.

The solvent that is capable of dissolving the antistatic hard coat agent is preferably those which are capable of dissolving the cycloolefin polymer and being easily evaporated. In the present invention, a mixture of a particle aggregation solvent and a particle dispersion solvent is preferably used from the viewpoint of obtaining the antistatic hard coat film with few streaks and the surface resistance value within a prescribed range.

The particle aggregation solvent refers to a solvent that facilitates the aggregation of the metal oxide fine particles. The antistatic hard coat layer, which is obtained by the application of the antistatic hard coat agent dissolved in such a solvent, can have the surface resistance value confined within a prescribed range. Examples of the particle aggregation solvent may include a ketone-based solvent, and specific examples thereof may include methyl ethyl ketone (MEK) and methyl isobutyl ketone (MIBK).

The particle dispersion solvent refers to a solvent that facilitates the dispersion of the metal oxide fine particles. Inclusion of the particle dispersion solvent in the composition can suppress the aggregation of the metal oxide fine particles and thus suppress an increase in viscosity and the occurrence of coating streaks and the like. Examples of the particle dispersion solvent may include an alcohol, in particular, an alcohol having a boiling point of lower than 100° C. Examples of the above-mentioned alcohol may include methanol, ethanol, ethanol mixture, n-propanol, and isopropanol. Of these, the ethanol mixture is preferable. The lower limit of the boiling point of such an alcohol is not particularly limited. However, it may be, for example, 40° C. or higher.

The ethanol mixture refers to a mixed solvent that contains ethanol as a main component and further includes an alcohol other than ethanol and optionally water. Examples of the alcohol other than ethanol may include methanol, n-propanol, isopropanol, and butanol. Of these, methanol and n-propanol are preferable. As the alcohol other than ethanol, one type thereof may be solely used, and two or more types thereof may also be used in combination at any ratio. The main component herein refers to a component having a content ratio of 50% or more.

The mixing ratio (weight ratio) between ethanol and the alcohol other than ethanol in the ethanol mixture is preferably 70:30 to 96:4, more preferably 80:20 to 90:10, and further preferably 84:16 to 87:13.

The mixing ratio (weight ratio) between the particle aggregation solvent and the particle dispersion solvent (particle aggregation solvent:particle dispersion solvent) is preferably 50:50 to 85:15, more preferably 55:45 to 75:25, and further preferably 60:40 to 70:30. When the mixing ratios are confined within the above-mentioned ranges, it is possible to increase liquid stability of the composition in which the antistatic hard coat agent is dissolved in the solvent, to extend a pot life, and to confine the surface resistance value within a prescribed range.

Further, it is preferable that the solvent further contains a high-boiling point solvent to suppress whitening on the surface of the antistatic hard coat layer. The high-boiling point solvent is a solvent that is different from the particle aggregation solvent and has a boiling point of 100° C. or higher. Examples of such a high-boiling point solvent may include diacetone alcohol, acetylacetone, diethylene glycol dimethyl ether, and propylene glycol monomethyl ether. The upper limit of the boiling point of such a solvent is not particularly limited. However, it may be, for example, 200° C. or lower.

The mixing ratio (weight ratio) between the particle aggregation solvent and the high-boiling point solvent (particle aggregation solvent:high-boiling point solvent) is preferably 67:33 to 95:5, more preferably 80:20 to 91:9, and further preferably 82:18 to 85:15.

The mixing ratio (weight ratio) between the particle dispersion solvent and the high-boiling point solvent (particle dispersion solvent:high-boiling point solvent) is preferably 60:40 to 85:15, more preferably 65:35 to 80:20, and further preferably 70:30 to 75:25.

When the mixing ratios are confined within the above-mentioned ranges, it is possible to increase liquid stability of the composition in which the antistatic hard coat agent is dissolved in the solvent, to extend a pot life, and to confine the surface resistance value within a prescribed range.

The amount of the solvent is preferably set so that the solid content concentration of the above-mentioned composition is confined within a desired range. The solid content concentration of the composition described herein is preferably 0.01% by weight or more, and more preferably 1% by weight or more, and is preferably 30% by weight or less, and more preferably 25% by weight or less. When the solid content concentration of the composition is confined within the above-mentioned range, a coating film obtained therefrom has a high antistatic effect. Further, the coating film thus obtained can be prevented from reduction of transparency and from increase of haze. Further, the concentration of the resin in the composition is in a range of preferably 1 to 5% by weight, and further preferably 0.2 to 39.6% by weight, based on the solid content of the resin. When the resin concentration falls within this range, high adhesiveness to the substrate film is ensured and a uniform thickness of the coating film to be formed can be achieved.

When the concentration of the above-mentioned metal oxide fine particles falls within the above-mentioned range, the thickness of the coating film is neither too thin nor too thick, and the coating film that has sufficient antistatic performance can be formed. Furthermore, the coating film has excellent transparency and low haze without having a crack in the coating film or curling in the substrate. Further, the viscosity of the composition is prevented from becoming high, and thus the composition exhibits excellent application properties. As a result, the surface of the antistatic layer can have improved flatness and less streak unevenness.

The viscosity of the composition is preferably 1 mPa·s or higher, more preferably 1.2 mPa·s or higher, and further preferably 1.3 mPa·s or higher, and is preferably 6 mPa·s or lower, more preferably 6.5 mPa·s or lower, further preferably 5.5 mPa·s or lower, and particularly preferably 3 mPa·s or lower. When the viscosity of the composition is confined within such a range, occurrence of the coating streaks can be suppressed. The viscosity of the composition may be measured by a method described below.

Further, the antistatic hard coat agent may include any optional component that may be contained in the antistatic hard coat layer.

The antistatic hard coat agent may be obtained by mixing respective components that the antistatic hard coat agent may contain by an appropriate mixing device. Examples of the mixing device may include a homogenizing mixer.

After the antistatic hard coat agent is prepared, the composition in which this antistatic hard coat agent is dissolved in the solvent is applied onto the substrate film to form a film of the composition on the substrate film. Then, after removing the solvent by drying as necessary, active energy rays such as ultraviolet rays are radiated to polymerize the polymerizable monomer, for curing the film of the composition. Thereby the antistatic hard coat layer is obtained.

Examples of an application method may include a slot coater, a spin coater, a roll coater, a curtain coater, and a screen printing. The heating temperature for removing the solvent and processing time in each step are appropriately set in accordance with types of the solvent and the materials, the thickness of the coating film, and the like.

The application of the above-mentioned composition is preferably performed under an environment of a specific relative humidity. Specifically, the above-mentioned relative humidity at the time of application is preferably 40% RH or higher, more preferably 45% RH or higher, further preferably 50% RH or higher, and particularly preferably 52% RH or higher, and is preferably 65% RH or lower, more preferably 60% RH or lower, further preferably 58% RH or lower, and particularly preferably 57% RH or lower. When the relative humidity of the environment at the time of application is equal to or more than the lower limit value of the above-mentioned range, the metal oxide fine particles can be aggregated to be sufficiently coupled in a chain form, and thus surface resistance value of the antistatic hard coat layer can be effectively reduced. Further, when the relative humidity of the environment at the time of application is equal to or more than the lower limit value of the above-mentioned range, discharge caused by electrification of the substrate film and coating unevenness caused by uneven electrification can be suppressed. Further, when the relative humidity of the environment at the time of application is equal to or less than the upper limit value of the above-mentioned range, excessive aggregation of the metal oxide fine particles can be suppressed. Thus, fracture and haze unevenness in the antistatic hard coat layer can be suppressed.

A specific description will now be given of the significance of adjusting the relative humidity of the environment at the time of application to the upper limit value or lower of the above-mentioned range.

In general, when a coating material containing a solvent is applied onto a substrate to form a coating film, the solvent is evaporated immediately after application. During evaporation, heat is taken from the substrate in an amount corresponding to evaporation heat of the solvent, which may cause dew condensation on a surface of the coating film. Such a phenomenon is called "blushing", and a region where the blushing occurs sometimes has a whitish appearance.

If the above-mentioned blushing occurs on the film of the composition formed on the substrate film, the metal oxide fine particles contained in the film of the composition may be excessively aggregated at a region where the blushing occurs. Excessive aggregation of the metal oxide fine particles may cause a fracture, haze unevenness, or the like of the antistatic hard coat layer.

Further, the above-mentioned blushing is likely to affect a region of the film of the composition having the antistatic hard coat agent dissolved, in which a large area is exposed to the outside air. This is because the large area exposed to the outside air accelerates cooling of such a region, which tends to generate dew condensation.

A near-edge portion of the film of the composition is usually exposed to the outside air not only on an upper surface but also on an edge surface of the film of the composition. Thus, in the near-edge portion of the film of the composition, a large area of the film of the composition is exposed to the outside air and cooled rapidly, so that the near-edge portion of the film is easily cooled and tends to generate dew condensation. As a result, the fracture and the haze unevenness are likely to occur in the antistatic hard coat layer particularly at the near-edge portion of the film of the composition due to an effect of the blushing described above.

On the other hand, when the relative humidity of the environment at the time of application is equal to or less than the upper limit value of the above-mentioned range, the occurrence of the blushing as described above can be suppressed. Thus, the fracture and the haze unevenness in the antistatic hard coat layer can be easily suppressed over the entire layer including the near-edge portion of the antistatic hard coat layer. As described herein, the adjustment of the relative humidity of the environment at the time of application to the upper limit value or less of the above-mentioned range is significant in terms of suppressing the aggregation of the electroconductive particles caused by the blushing and thereby suppressing the fracture and the haze unevenness of the antistatic hard coat layer in order to achieve the uniform antistatic hard coat layer.

After the composition is applied onto the substrate film as described above, the solvent is removed from the film of the composition by drying as necessary. The temperature and the pressure in drying are appropriately set in accordance with conditions, such as the type of the material of the antistatic hard coat layer, the type of the solvent, and the thickness of the antistatic hard coat layer.

Subsequently, irradiation with the active energy ray to the film of the composition is performed. This operation causes the polymerization of the polymerizable monomer to cure the film of the composition in which the antistatic hard coat agent is dissolved, and thus, the antistatic hard coat layer containing the metal oxide fine particles and the binder polymer can be obtained.

Irradiation conditions, such as a wavelength and an irradiation amount of the active energy ray, may be appropriately set in accordance with conditions, such as the type of the material of the antistatic hard coat layer and the thickness of the antistatic hard coat layer.

[3.5. Structure and Size of Antistatic Hard Coat Layer]

Figure 2:
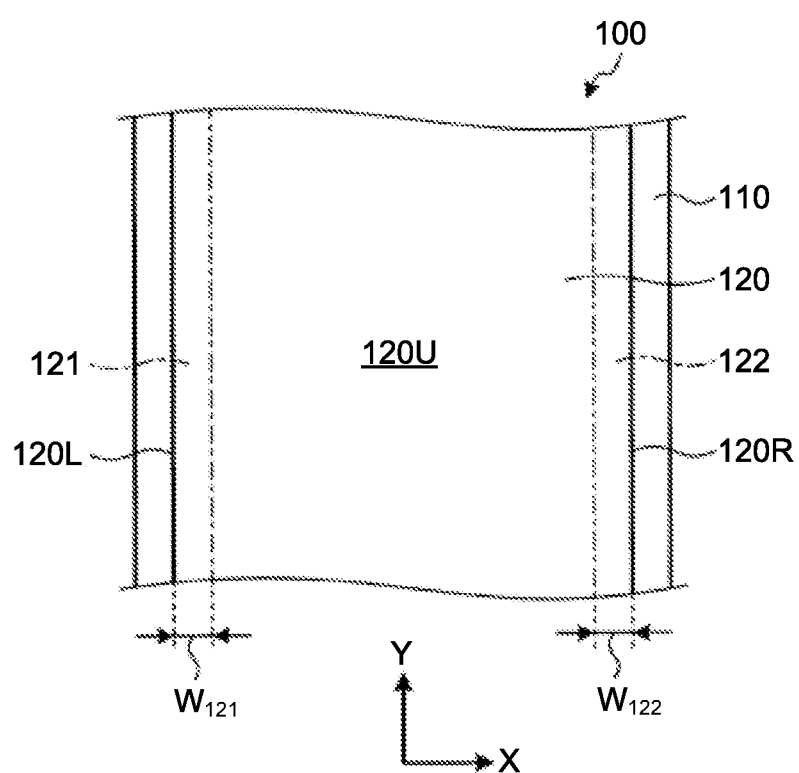
FIG. 2 is a plan view schematically illustrating the example of the antistatic hard coat film of the present invention.

FIG. 2 is a plan view schematically illustrating an example of the antistatic hard coat film of the present invention.

As described above, even the antistatic hard coat layer 120 included in the antistatic hard coat film 100 of the present invention is formed by applying the composition in which the antistatic hard coat agent is dissolved in the solvent onto the substrate film 110, the excessive aggregation of the metal oxide fine particles caused by the blushing can be suppressed. Thus, in such an antistatic hard coat layer 120, the number of the fractures in regions 121 and 122 near both edge portions of the antistatic hard coat layer 120 in an application width direction X can be reduced.

The application width direction X of the antistatic hard coat layer 120 herein refers to a direction that is an in-plane direction of the antistatic hard coat layer 120 and is perpendicular to an application direction Y in the step of applying the above-mentioned composition for forming the antistatic hard coat layer 120. When the substrate film 110 is a long-length film, the application width direction X is usually parallel to the width direction of the substrate film 110.

Further, the regions 121 and 122 near both edge portions of the antistatic hard coat layer 120 in the application width direction X respectively refer to regions within 50 mm from edge portions 120L and 120R of the antistatic hard coat layer 120 in the application width direction X. That is, the above-mentioned regions 121 and 122 respectively refer to regions having a width $W_{121}$ of 50 mm and a width $W_{122}$ of 50 mm, which are continued from the edge portions 120L and 120R of the antistatic hard coat layer 120 in the application width direction X.

As described above, the blushing at the time of applying the composition generally tends to occur near the edge portions of the film of the composition. The near-edge portions of the film of the composition correspond to the regions 121 and 122 near the both edge portions of the antistatic hard coat layer 120 in the application width direction X. Thus, the fracture of the antistatic hard coat layer 120 tends to occur in the regions 121 and 122. However, as described above, an appropriate adjustment of the relative humidity of the environment in which the composition is applied can reduce the number of the fractures in the regions 121 and 122 where the fracture tends to occur as described above.

Specifically, the number of the fractures, each having an area of 5 mm$^2$ or more, of the antistatic hard coat layer 120 occurring in the regions 121 and 122 within 50 mm from the edge portions of the antistatic hard coat layer 120 in the application width direction X is preferably less than 10, more preferably 5 or less, and particularly preferably 2 or less, per meter length of the both regions 121 and 122. This can reduce a haze value over the entire antistatic hard coat film and thus can improve the transparency of the antistatic hard coat film. Further, the surface resistance value of the antistatic hard coat layer can be confined within a specific range over the entire antistatic hard coat film.

The number of the fractures of the antistatic hard coat layer 120 may be measured by the following method.

The regions 121 and 122 within 50 mm from the edge portions of the antistatic hard coat layer 120 in the application width direction X are inspected under a microscope. Then, an area of the fracture is measured in a microscope visual field. In this measurement, the fracture having an area of 5 mm$^2$ or more is counted as one fracture. This operation is performed in a range of 1 m length of the above-mentioned regions 121 and 122 in the application direction Y to measure the number of the fractures per meter length of the both regions 121 and 122.

The antistatic hard coat layer may have a multi-layer structure having two or more layers. However, it preferably has a single-layer structure having only one layer. When the antistatic hard coat layer has a single-layer structure, the antistatic hard coat layer can be easily produced and the thickness of the antistatic hard coat film can be reduced.

The thickness of the antistatic hard coat layer is preferably 0.5 μm or more, more preferably 1.0 μm or more, further preferably 1.5 μm or more, and particularly preferably 2.0 μm or more, and is preferably 10 μm or less, more preferably 8 μm or less, further preferably 7 μm or less, and particularly preferably 6 μm or less. When the thickness of the antistatic hard coat layer is confined within the above-mentioned range, curling of the antistatic hard coat film can be suppressed and surface resistance value of the antistatic hard coat layer can be reduced. Further, scratch resistance of the antistatic hard coat layer can be usually improved.

The thickness of the antistatic hard coat layer may be measured by an interference-type film thickness meter ("F20 film thickness measurement system" manufactured by Filmetrics Japan, Inc.).

The ratio of the thickness of the antistatic hard coat layer with respect to the thickness of the substrate film (antistatic hard coat layer/substrate film) is preferably 1/50 or higher, more preferably 1/35 or higher, and particularly preferably 1/25 or higher, and is preferably 1/2 or lower, more preferably 1/3 or lower, and particularly preferably 1/4 or lower. When the ratio of the thickness of the antistatic hard coat layer with respect to the thickness of the substrate film is confined within the above-mentioned range, curling of the antistatic hard coat film can be stably suppressed.

[3.6. Properties of Antistatic Hard Coat Layer]

The surface resistance value of the antistatic hard coat layer is usually $1.0\times10^6$ Ω/sq. or more, preferably $1.0\times10^7$ Ω/sq. or more, and more preferably $1.0\times10^8$ Ω/sq. or more, and is usually $1.0\times10^{10}$ Ω/sq. or less, preferably $5.0\times10^9$ Ω/sq. or less, and more preferably $1.0\times10^9$ Ω/sq. or less. The antistatic hard coat layer having such a surface resistance value can improve the antistatic properties of the antistatic hard coat film. Thus, when the antistatic hard coat film is installed in a liquid crystal display device including an in-cell type touch panel, occurrence of unevenness in liquid crystal driving due to electrification during operation of the touch panel can be suppressed.

The surface resistance value may be measured by Hiresta-UX MCP-HT800 (manufactured by Mitsubishi Chemical Analytech Co., Ltd.) in accordance with JIS K6911.

The number of streaks each having a length of 20 cm or longer of the antistatic hard coat layer is usually 2 or less, preferably 1 or less, more preferably 0, per area of 1,330 mm×500 mm of the antistatic hard coat layer. When the number of the streaks per area of 1,330 mm×500 mm of the antistatic hard coat layer is confined within the above-mentioned range, change in a color tone depending on an installation direction and occurrence of display unevenness that affect image visibility, if the antistatic hard coat film is installed in a liquid crystal display device, can be suppressed.

The number of the streaks each having a length of 20 cm or longer may be measured by a method in which a sample film having a size of 1,330 mm×500 mm is cut out such that a side of 500 mm is parallel to the application direction of the composition in which the antistatic hard coat agent is dissolved in the solvent, and the sample film is visually inspected on a side of the antistatic hard coat layer.

The refractive index of the antistatic hard coat layer is preferably 1.500 or higher, more preferably 1.510 or higher, further preferably 1.515 or higher, and particularly preferably 1.520 or higher, and is preferably 1.550 or lower, more preferably 1.540 or lower, further preferably 1.535 or lower, and particularly preferably 1.530 or lower. When the refractive index of the antistatic hard coat layer is confined within the above-mentioned range, it is possible to confine the refractive index of the antistatic hard coat layer within a range similar to that of the refractive index of the substrate film. This can make coating unevenness and an uneven spot of the antistatic hard coat layer less visually recognizable, and thus the excellent appearance of the antistatic hard coat film can be easily achieved.

The refractive index of the antistatic hard coat layer is a numerical value at a wavelength of 550 nm obtained by performing Cauchy fitting on the basis of values measured at three wavelengths of 407 nm, 532 nm, and 633 nm using a refractive index film thickness measuring device ("Prism Coupler" manufactured by Metricon Corp.).

The water contact angle of the surface of the antistatic hard coat layer is preferably 70° to 90°. When the water contact angle of the surface of the antistatic hard coat layer falls within this range, repellency of an adhesive can be suppressed when the antistatic hard coat film is bonded using the adhesive. Thus, for example, when a gap between a polarizing plate including the antistatic hard coat film and a touch panel is filled with an interlayer adhesive during the production of a liquid crystal display device, repellency between the interlayer adhesive and the polarizing plate can be suppressed. The water contact angle described herein can be measured by a θ/2 method in accordance with JIS R3257.

The antistatic hard coat layer in the present invention having the antistatic capability can also function as a hard coat layer.

The JIS pencil hardness of the antistatic hard coat layer is preferably B or higher, more preferably HB or higher, and particularly preferably H or higher. By having a high JIS pencil hardness of the antistatic hard coat layer, the antistatic hard coat layer can also function as a hard coat layer, and the scratch resistance of the antistatic hard coat film can thus be improved. The JIS pencil hardness described herein is measured in accordance with JIS K5600-5-4 by scratching a surface of the layer with pencils of a variety of hardness pushed on the surface at an inclination angle of 45° with a downward load of 500 gram-force. The JIS pencil hardness is determined as the hardness of the pencil that begins to create scratches.

The scratch resistance of the antistatic hard coat layer is obtained by the following method. The surface of the antistatic hard coat layer of the antistatic hard coat film is rubbed back and forth for 10 cycles with steel wool #0000 applied with a load of 10 gf, 50 gf, 100 gf, or 500 gf per square centimeter of steel wool. The surface state after the back-and-forth rubbing is visually inspected to determine the load leaving no scratches.

The load leaving no scratches is preferably 10 gf or more, more preferably 50 gf or more, and particularly preferably 100 gf or more. By having a high scratch resistance of the antistatic hard coat layer, occurrence of scratches caused by an unintended external factor during a process of, for example, producing a polarizing plate can be suppressed.

[4. Optional Layer]

The antistatic hard coat film of the present invention may include an optional layer in combination with the substrate film and the antistatic hard coat layer.

For example, the antistatic hard coat film may include an anti-reflective layer on the antistatic hard coat layer.

Further, the antistatic hard coat film may include an adhesion facilitating layer on the surface of the substrate film on a side opposite to the antistatic hard coat layer.

[5. Properties and Shape of Antistatic Hard Coat Film]

Specifically, the haze value of the antistatic hard coat film is usually 1.0% or less, preferably 0.75% or less, more preferably 0.5% or less, and particularly preferably 0.3% or less. When the antistatic hard coat film has the haze value in such a range, a liquid crystal display device including such an antistatic hard coat film can display a clear image without having a reduction in image visibility caused by the haze.

The haze value of the antistatic hard coat film may be measured by using a haze meter ("Haze Guard II" manufactured by Toyo Seiki Seisaku-sho, Ltd.) in accordance with JIS K7136.

The transmission hue L* of the antistatic hard coat film is preferably 94 or higher, more preferably 94.5 or higher, further preferably 94.7 or higher, and particularly preferably 95.0 or higher, and is preferably 97 or lower, more preferably 96.5 or lower, further preferably 96.3 or lower, and particularly preferably 96.0 or lower. When the transmission hue L* of the antistatic hard coat film is confined within the above-mentioned range, image visibility in a liquid crystal display device including such an antistatic hard coat film can be improved.

The transmission hue L* described above is a coordinate L* in an L*a*b* colorimetric system. The transmission hue L* of the antistatic hard coat film can be measured by a spectrophotometer ("V-7200" manufactured by JASCO Corp.) using a C light source.

The total light transmittance of the antistatic hard coat film is preferably 85% or higher, more preferably 86% or higher, and particularly preferably 88% or higher.

The total light transmittance of the antistatic hard coat film may be measured in a wavelength range of 380 nm to 780 nm using an ultraviolet-visible spectrometer.

The thickness of the antistatic hard coat film is 10 μm or more and 100 μm or less, and more preferably 20 μm or more and 60 μm or less. When the thickness of the antistatic hard coat film falls within the above-mentioned range, the thickness of a polarizing plate can be advantageously reduced.

The thickness of the antistatic hard coat film may be measured using a contact-type film thickness meter (ABS Digimatic Indicator manufactured by Mitutoyo Corp.).

The light transmittance of the antistatic hard coat film at a wavelength of 380 nm is 10% or less, preferably 5% or less, and the light transmittance of the antistatic hard coat film at a wavelength of 380 nm is further preferably 1% or less. Further, the light transmittance at a wavelength of 280 nm to 370 nm is 1.5% or less, and the light transmittance at a wavelength of 280 nm to 370 nm is 1% or less. In the present invention, if the light transmittance at a wavelength of 380 nm exceeds 10%, the polarizer is deteriorated by ultraviolet rays, resulting in a reduction in a polarization degree. The above-mentioned light transmittance may be measured using a spectrophotometer in accordance with JIS K0115. When the light transmittance at wavelengths of 280 nm to 370 nm and 380 nm fall within the above-mentioned ranges, discoloration and a reduction in the polarization degree of the polarizer, if the antistatic hard coat film is used by bonding to the polarizer, can be suppressed.

The light transmittance may be measured using an ultraviolet-visible near infrared spectrophotometer ("V-7200" manufactured by JASCO Corp.).

The in-plane retardation of the antistatic hard coat film at a wavelength of 550 nm is 85 nm or more and 120 nm or less, and more preferably 90 nm or more and 110 nm or less. When the retardation of the antistatic hard coat film falls within the above-mentioned range, darkening of a display image depending on a direction of a viewer who uses a liquid crystal display device with polarized sunglasses does not occur, even if such an antistatic hard coat film is used in the polarizing plate.

The antistatic hard coat film may be a long-length film or a sheet-shaped film. The antistatic hard coat film is usually produced as the long-length film from the viewpoint of improved production efficiency. Further, when the sheet-shaped antistatic hard coat film is produced, the sheet-shaped antistatic hard coat film is usually produced by cutting the long-length antistatic hard coat film in a desired shape.

[6. Polarizing Plate]

The antistatic hard coat film of the present invention is preferably provided to a polarizing plate. The polarizing plate provided with the antistatic hard coat film of the present invention usually includes the antistatic hard coat film and a polarizer, in which the polarizer and the substrate film are bonded to each other.

The polarizer for use may be of any type. The polarizer is generally obtained by doping a polyvinyl alcohol-based film with iodine or the like and then stretching the film.

The polarizing plate may include an optional polarizing-plate protective film, the polarizer, and the antistatic hard coat film in this order. As the optional polarizing-plate protective film, an isotropic film that is optically isotropic may be used. Alternatively, a phase difference film having a desired retardation may also be used. When the phase difference film is used as the polarizing-plate protective film, the phase difference film exhibits an optical compensation function, thereby to, for example, improve viewing angle dependence and improve viewing angle characteristics of the liquid crystal display device by compensating a light leakage phenomenon of the polarizer occurring when viewed obliquely. Examples of such a phase difference film that may be used may include a film stretched uniaxially in the longitudinal direction, a film stretched uniaxially in the transverse direction, a film stretched biaxially in the longitudinal and transverse directions, and a phase difference film obtained by polymerizing a liquid crystal compound. Examples of the phase difference film may include a film obtained by uniaxially or biaxially stretching a thermoplastic resin film formed of a thermoplastic resin such as a cycloolefin resin. Further, specific examples of a commercially available thermoplastic resin film may include "ZEONOR Film" manufactured by ZEON Corporation; "Escena" and "SCA40" manufactured by Sekisui Chemical Co., Ltd.; and "ARTON film" manufactured by JSR Corp.

The method for bonding the polarizer and the substrate film is not particularly limited. They may be bonded to each other via an adhesive layer or directly bonded to each other by a method such as a plasma treatment performed on a member surface. The description of the adhesive will be given below.

[7. Liquid Crystal Display Device and Touch Panel]

The antistatic hard coat film of the present invention is preferably provided to a liquid crystal display device. The liquid crystal display device provided with the antistatic hard coat film of the present invention usually includes a liquid crystal cell, the polarizer provided on a viewing side of the liquid crystal cell, and the antistatic hard coat film provided on a viewing side of the polarizer. Further, in such a configuration, the antistatic hard coat film is preferably provided such that the substrate film and the antistatic hard coat layer are provided in this order from the proximity of the polarizer. As a preferable example of the liquid crystal display device, the liquid crystal display device may include the liquid crystal cell, an optional polarizing-plate protective film, the polarizer, and the antistatic hard coat film in this order from a liquid crystal cell side to a viewing side (a side on which a user views an image).

As the antistatic hard coat film of the present invention is excellent in transparency and antistatic properties, a drive control of liquid crystal molecules in the liquid crystal cell can be stabilized in the above-mentioned liquid crystal display device while an image displayed on the liquid crystal display device is maintained clear. Further, the substrate film of the antistatic hard coat film is formed of the thermoplastic resin containing the cycloolefin polymer, and thus the above-mentioned liquid crystal display device has better heat resistance and moisture resistance than a conventional liquid crystal display device that includes a polarizing-plate protective film formed of a material such as triacetyl cellulose. Further, such an antistatic hard coat film does not require an aqueous adhesive for bonding films, and deterioration of the quality in a durability test under high temperature and high humidity conditions can be suppressed. Further, in particular, when the substrate film of the antistatic hard coat film contains the ultraviolet absorber, constituent members such as the liquid crystal cell and the polarizer can be protected from ultraviolet rays that the constituent members receive during the production of the liquid crystal display device and ultraviolet rays in outside light that the constituent members receive when the liquid crystal display device is used.

The liquid crystal cell for use may be of any mode, such as a TN mode, a VA mode and an IPS mode. Of these, the liquid crystal cell of the IPS mode is preferable because a display color of the liquid crystal display does not change even when a viewing angle is changed. Further, in the case where the liquid crystal display device is used as a touch panel sensor, an in-cell type liquid crystal cell may be used in order to reduce the total thickness of the liquid crystal display device. In the case where the liquid crystal display device is used as a touch panel, a cover glass is preferably provided on an outermost surface on a viewing side. The viewing side refers to a side on which a viewer who observes a display image is positioned when the liquid crystal display device is used.

The antistatic hard coat film is usually provided such that the substrate film is nearer to the liquid crystal cell than the antistatic hard coat layer is. Further, in particular, when the substrate film of the antistatic hard coat film is a ¼ wave plate, the antistatic hard coat film is preferably provided such that a slow axis of the substrate film of the antistatic hard coat film forms a specific angle θ with respect to a transmission axis of the polarizer. Specifically, the above-mentioned angle θ is preferably 40° or more, and more preferably 43° or more, and is preferably 50° or less, and more preferably 48° or less. The angle θ is particularly preferably an angle in a range of 45°±1°. In such a configuration, polarized light that passes through the liquid crystal cell and the polarizer and then travels through the antistatic hard coat film can be converted into circularly polarized light or elliptically polarized light. Thus, a displayed content can be viewed by a user who uses the liquid crystal display device while wearing polarized sunglasses.

The constituent members of the liquid crystal display device, such as the liquid crystal cell, the polarizing-plate protective film, the polarizer, and the antistatic hard coat film, may be integrated by bonding. For example, the polarizing-plate protective film, the polarizer, and the antistatic hard coat film may be bonded to each other to form a single polarizing plate. Further, such a polarizing plate may be fixed to the liquid crystal cell by bonding the polarizing plate to the liquid crystal cell. In such cases, the above-mentioned constituent members may be bonded to each other via a suitable adhesive layer or directly bonded to each other by a method such as a plasma treatment performed on surfaces of the members.

The adhesive for use may be of any type. Examples thereof may include a rubber-based adhesive, a fluorine-based adhesive, an acrylic-based adhesive, a polyvinyl alcohol-based adhesive, a polyurethane-based adhesive, a silicone-based adhesive, a polyester-based adhesive, a polyamide-based adhesive, a polyether-based adhesive, and an epoxy-based adhesive. As the adhesive, one type thereof may be solely used, and two or more types thereof may also be used in combination at any ratio. In particular, it is preferable that an ultraviolet-curable adhesive layer such as, for example, an acrylic-based adhesive layer is provided between the polarizer and the antistatic film to bond the polarizer and the antistatic film together via the ultraviolet-curable adhesive layer. Such an adhesion can reduce an effect of moisture on the polarizer and thus can suppress deterioration of the polarizer. In such an adhesion, the film thickness of the adhesive layer is preferably 0.1 μm or more and 2.0 μm or less.

EXAMPLES

Hereinafter, the present invention will be described in detail by way of Examples. However, the present invention is not limited to the following Examples and may be implemented with any modifications without departing from the scope of the claims of the present invention and equivalents thereto.

In the following description, "%" and "part" expressing an amount are on the basis of weight unless otherwise specified. The operations described below were performed under conditions of normal temperature and normal pressure in atmospheric air unless otherwise specified.

[Evaluation Methods]

(Method for Measuring Surface Resistance Value)

The film was cut out to obtain a sample film having a size of 100 mm×100 mm. A probe was fixed on the antistatic hard coat layer of the sample film and the surface resistance value of the surface of the sample film on a side of the antistatic hard coat layer was measured using Hiresta-UX MCP-HT800 (manufactured by Mitsubishi Chemical Analytech Co., Ltd.) in accordance with JIS K6911. The measurement was performed at a total of 5 different locations on the antistatic hard coat layer and an average value of the measurement values was calculated to obtain the surface resistance value. Measurement was performed under conditions of output of 500 W and duration of 10 seconds.

(Method for Measuring Viscosity)

The viscosity of the composition in which the antistatic hard coat agent was dissolved in the solvent was measured with 15 mL of the composition placed in a measurement cell, using a tuning fork oscillator type viscometer (SV series manufactured by A & D Co.).

(Method for Measuring Thickness of Coating Film)

The thickness of the coating film was measured using an interference-type film thickness meter (F20 film thickness measurement system manufactured by Filmetrics Japan, Inc.).

(Method for Measuring Thickness of Substrate Film)

The thickness of the substrate film was measured using a contact-type film thickness meter (ABS Digimatic Indicator manufactured by Mitutoyo Corp.).

(Method for Evaluating Streaks)

The film was cut out to obtain a sample film having a rectangular shape with a size of 1,330 mm×500 mm. In this preparation, the sample film was cut out such that the edge of 500 mm is parallel to the application direction. For inspecting streaks, the sample film on the side of the antistatic hard coat layer was visually inspected for the presence and the length of the streaks under a Polarion light (manufactured by CSC Co, Ltd.). Then, the case wherein 2 or more streaks with a length of 20 cm or longer existed was rated "2", and the case wherein 3 or more streaks with a length of 20 cm or longer existed was rated "1".

(Method for Evaluating Visibility of Image on Liquid Crystal Display Device)

An image was displayed on a display surface of the liquid crystal display device and the display surface was observed from the front direction through polarized sunglasses. The display surface was rotated by 45° around a rotating axis perpendicular to the display surface to perform inspection in 8 installation directions.

For evaluation, the case where the image was clearly visible without a change in a color tone of the image in any installation directions was rated "3", indicating that the visibility of the image was particularly good. Further, the case where slight image blurring was observed or the color tone of the image was slightly changed depending on the installation directions was rated "2", indicating that the visibility of the image was good. Further, the case where severe image blurring was observed, the color tone was changed depending on the installation directions, or display unevenness was observed was rated "1", indicating that the visibility of the image was poor.

(Method for Evaluating Stability of Liquid Crystal Driving in Liquid Crystal Display Device)

A touch panel of the liquid crystal display device was operated. In this operation, the case where an image was visible with no disturbance of liquid crystal driving was rated "3", indicating that the stability of the liquid crystal driving was particularly good. Further, the case where the liquid crystal driving was rarely disturbed was rated "2", indicating that the stability of the liquid crystal driving was good. Further, the case where image distortion and display unevenness were observed was rated "1", indicating that the stability of the liquid crystal driving was poor.

Example 1

(1-1. Production of Substrate Film)

As the substrate film, a diagonally stretched film formed of a cycloolefin polymer was prepared. This substrate film was a stretched film prepared by stretching a long-length film formed of a cycloolefin polymer (a thickness of 40 μm, product name "ZEONOR Film ZF14-040" manufactured by ZEON Corporation, hereinafter also abbreviated as "ZNR".) at a stretch ratio of 1.5 times in a direction of 45° with respect to a short-length direction of the film. The thickness of the film was 25 μm.

(1-2. Production of Composition (B1) in which Antistatic Hard Coat Agent is Dissolved)

Metal oxide fine particles were produced by the following method.

A solution was obtained by dissolving 130 parts by weight of potassium stannate and 30 parts by weight of antimony potassium tartrate in 400 parts by weight of pure water. This solution was added to a solution prepared by dissolving 1.0 parts by weight of ammonium nitrate and 12 parts by weight of 15 wt. % ammonia water in 1,000 parts by weight of pure water. A mixed solution was stirred at 60° C. for 12 hours to perform hydrolysis. The mixed solution was maintained at a pH of 9.0 by adding a 10 wt. % nitric acid solution during the hydrolysis.

Precipitate formed by the hydrolysis was separated by filtration and washed. The precipitate was then dispersed again in water to prepare a dispersion containing 20% by weight, in terms of a solid content, of a hydroxide of an antimony-doped tin oxide precursor. This dispersion was spray-dried at a temperature of 100° C. Powders thus obtained were heated at 550° C. for 2 hours in an air atmosphere to obtain antimony-doped tin oxide powders. 60 parts by weight of the powders were dispersed in 140 parts by weight of a 4.3 wt. % aqueous solution of potassium hydroxide. While maintained at 30° C., the dispersion was subjected to grinding in a sand mill for 3 hours to prepare a sol.

The sol thus obtained was subjected to a dealkalization ion treatment using an ion exchange resin until the pH became 3.0. Subsequently, pure water was added to the sol to prepare an aqueous dispersion of metal oxide fine particles (1) having 20% by weight, in terms of the solid content, of antimony-doped tin oxide fine particles. The pH of the aqueous dispersion of the metal oxide fine particles was 3.3. Further, the average particle diameter of the metal oxide fine particles (1) was 9 nm. Subsequently, 100 parts by weight of the aqueous dispersion of the metal oxide fine particles (1) thus obtained was adjusted to a temperature of 25° C. To this aqueous dispersion, 4 parts by weight of tetraethoxysilane (manufactured by Tama Chemicals Co., Ltd.; tetraethyl orthosilicate, an $SiO_2$ concentration of 28.8% by weight) was added over 3 minutes, followed by stirring for 30 minutes. Subsequently, 100 parts by weight of a mixed solvent containing 86.8% by weight of ethanol, 9.3% by weight of isopropyl alcohol, and 3.9% by weight of methanol (hereinafter abbreviated as an ethanol mixture 1) was added thereto over 1 minute. Temperature of the mixture was elevated to 50° C. over 30 minutes, and the mixture was subjected to a heat treatment for 15 hours. The solid content at this stage was 10% by weight. Subsequently, water and other solvent, which were dispersion media, were removed by an ultrafiltration membrane and replaced with a mixed solvent containing 85.5% by weight of ethanol, 9.6% by weight of normal-propyl alcohol, and 4.9% by weight of methanol (hereinafter abbreviated as an ethanol mixture 2) to prepare a dispersion of silica-covered metal oxide fine particles (1) in a chain form having the solid content of 19.4% by weight. An average coupling number of fine particles constituting each metal oxide fine particle (1) in a chain form was 5. The average coupling number described herein was determined by taking a photograph of the metal oxide fine particles in a chain form with a transmission type electron microscope, obtaining the coupling number for 100 metal oxide fine particles in a chain form, calculating an average value of the coupling number and rounding it off.

An ultraviolet-curable polymerizable monomer composition (R1) including dipentaerythritol hexaacrylate (this may be abbreviated hereinafter as "DP6A"), dipentaerythritol pentaacrylate (this may be abbreviated hereinafter as "DPSA"), and dipentaerythritol tetraacrylate (this may be abbreviated hereinafter as "DP4A") was prepared. In this polymerizable monomer composition (R1), a weight ratio of each component was DP6A/DPSA/DP4A=64/17/19. Further, the solid content concentration of the polymerizable monomer composition (R1) was 100%.

A polyfunctional urethane acrylate (U1) was prepared as a urethane reaction acrylate obtained by performing a urethane reaction between 222 parts by weight of isophorone diisocyanate and 795 parts by weight of a mixture of pentaerythritol triacrylate (hereinafter also abbreviated as "PE3A") and pentaerythritol tetraacrylate (hereinafter also abbreviated as "PE4A") (PE3A/PE4A=75/25 (weight ratio)). The solid content concentration of the polyfunctional urethane acrylate (U1) was 100%. The composition (R1) and the polyfunctional urethane acrylate (U1) thus obtained were used as a monomer composition providing a binder polymer.

The ethanol mixture 2 as a mixture of ethanol, normal-propyl alcohol, and methanol was prepared.

A mixture liquid was obtained by thoroughly mixing 13.7 parts by weight of the above-mentioned polymerizable monomer composition (R1), 1.5 parts by weight of the above-mentioned polyfunctional urethane acrylate (U1), and 0.4 parts by weight of a photopolymerization initiator (a combination of 0.09 parts by weight of "Irgacure 184" and 0.31 parts by weight of "Irgacure 127", manufactured by BASF Japan Ltd.). To this mixture liquid, 21.63 parts by weight of the dispersion of the metal oxide particles (1) in a chain form obtained as described above (containing 19.4% by weight of the solid content, corresponding to 4.2 parts by weight. The ingredient other than the solid content is 17.43 parts by weight of the ethanol mixture 2.) and 0.5 parts by weight of a leveling agent ("BYK-UV3576" manufactured by BYK Chemie Japan Co., Ltd.) were added, and the resulting mixture was uniformly mixed to obtain an active energy ray-curable liquid composition (B1).

After preparing the composition (B1), the composition (B1) was diluted by adding a mixed solution of 47.11 parts by weight of methyl ethyl ketone, 6.18 parts by weight of the above-mentioned ethanol mixture 2, and 9.28 parts by weight of diacetone alcohol to obtain a composition (B2). The viscosity of the composition (B2) was measured by the above-mentioned measuring method and it was 1.5 mPa·s.

(1-3. Production of Antistatic Film)

The diagonally stretched film obtained in the step (1-1) was subjected to a corona treatment (output of 0.4 kW, discharge amount of 200 W·min/m$^2$) on a surface on a side opposite to a masking film. The composition (B2) produced as described above was applied onto the surface on which the corona treatment was performed using a die coater such that the thickness of the antistatic hard coat layer obtained after curing became 3.0 μm, to form a film of the composition (B2). The application of the composition (B2) was performed under an environment of a relative humidity of 50%.

Subsequently, the film of the composition (B2) was dried at 60° C. for 2 minutes and then cured by irradiation with light of 250 mJ/cm$^2$ from a high-pressure mercury lamp to obtain an antistatic hard coat layer. The antistatic hard coat film thus obtained was wound into a roll shape with a winding tension of 200 N.

The antistatic hard coat layer of the antistatic hard coat film thus obtained was evaluated for the surface resistance value and the presence of the streaks by the methods described above.

(1-4. Production of Polarizing Plate)

A polarizer was produced by doping a resin film (a polyvinyl alcohol (PVA) film) with iodine and stretching the film in one direction. The polarizer was thus prepared. Further, the antistatic hard coat film was drawn out from the above-mentioned roll of the antistatic hard coat film, and the masking film was removed to expose the surface of the substrate film on the side opposite to the antistatic hard coat layer. The exposed surface of the substrate film was then bonded to one surface of the above-mentioned polarizer using an ultraviolet-curable acrylic adhesive. In this process, the bonding was performed such that the slow axis of the substrate film formed an angle of 45° with respect to the transmission axis of the polarizer.

Further, the other surface of the polarizer was bonded to a cycloolefin film that had been stretched uniaxially in the transverse direction as a polarizing-plate protective film using the ultraviolet-curable acrylic adhesive. In this process, the bonding was performed such that the slow axis of the cycloolefin film became parallel to the transmission axis of the polarizer.

Subsequently, the adhesive was cured by irradiation with ultraviolet rays to obtain a polarizing plate including the polarizing-plate protective film, the adhesive layer, the polarizer, the adhesive layer, the substrate film, and the antistatic hard coat layer in this order in the thickness direction.

(1-5. Production of Liquid Crystal Display Device)

The polarizing plate produced as described above was installed in a liquid crystal panel with a touch sensor, which includes an in-cell type liquid crystal cell, to produce a liquid crystal display device. In this process, a direction of the polarizing plate was set such that the surface of the polarizing plate on a side of the antistatic hard coat layer faced a viewing side.

The visibility of an image and the stability of the liquid crystal driving in the liquid crystal display device thus obtained were evaluated by the methods described above.

Example 2

In Example 1, the substrate film was replaced with a film formed of a cycloolefin polymer stretched uniaxially in the transverse direction (manufactured by ZEON Corporation, Tg of 126° C.). The production and evaluation of the antistatic hard coat film, and the production and evaluation of the liquid crystal display device were performed in the same manner as those in Example 1 except for the matter described above.

Example 3

In Example 1, the thickness of the substrate film was changed from 25 μm to 47 μm. The production and evaluation of the antistatic hard coat film, and the production and evaluation of the liquid crystal display device were performed in the same manner as those in Example 1 except for the matter described above.

Example 4

In Example 1, the coating thickness of the composition (B2) was changed from 3 μm to 10 μm. The production and evaluation of the antistatic hard coat film, and the production and evaluation of the liquid crystal display device were performed in the same manner as those in Example 1 except for the matter described above.

Example 5

After preparing the composition (B1), dilution thereof was performed with the mixed solution in which 53.21 parts by weight of methyl isobutyl ketone was used in place of 47.11 parts by weight of methyl ethyl ketone, and 6.18 parts by weight of the ethanol mixture 2 was omitted. A composition (B3) having the solid content concentration of 20% was obtained in the same manner as that in the step (1-2) in Example 1 except for the matter described above. The production and evaluation of the antistatic hard coat film, and the production and evaluation of the liquid crystal display device were performed in the same manner as those in Example 1 except that the composition (B3) was used in place of the composition (B2).

The viscosity of the composition (B3) was 3.0 mPa·s.

Example 6

To the composition (B1) obtained in the step (1-2) in Example 1, 38.0 parts by weight of methyl ethyl ketone, 5.1 parts by weight of the ethanol mixture 2, and 7.6 parts by weight of diacetone alcohol were added to obtain a composition (B4) having the solid content concentration of 23%.

The production and evaluation of the antistatic hard coat film, and the production and evaluation of the liquid crystal display device were performed in the same manner as those in Example 1 except that the composition (B4) was used in place of the composition (B2).

The viscosity of the composition (B4) was 8.0 mPa·s.

Example 7

(7-1. Production of Substrate Film)

As the substrate film, a diagonally stretched film formed of the cycloolefin polymer was prepared. This substrate film was a stretched film prepared by stretching a long-length film formed of a cycloolefin polymer (a thickness of 70 μm, product name "ZEONOR Film ZF14-070") at a stretch ratio of 1.5 times in a direction of 45° with respect to a short-length direction of the film. The thickness of the substrate film was 47 μm.

(7-2. Production of Composition (B8) in which Antistatic Hard Coat Agent was Dissolved)

A mixture liquid was obtained by thoroughly mixing 7.2 parts by weight of the polymerizable monomer composition (R1), 0.8 parts by weight of the polyfunctional urethane acrylate (U1), and 0.4 parts by weight of the photopolymerization initiator.

To this mixture liquid, 28.76 parts by weight of the dispersion of the metal oxide particles (1) (containing 38.2% by weight of the solid content, corresponding to 11.33 parts by weight. The ingredient other than the solid content is 17.43 parts by weight of the ethanol mixture 2.) and 0.5 parts by weight of the leveling agent were added, and the resulting mixture was uniformly mixed to obtain an active energy ray-curable liquid composition (B7).

As the composition (R1), the polyfunctional urethane acrylate (U1), the photopolymerization initiator, the metal oxide particles (1) in a chain form, and the leveling agent, the same ones as those used in the step (1-2) in Example 1 were used.

The composition (B7) thus prepared was diluted by adding a mixed solution of 47.11 parts by weight of methyl ethyl ketone, 6.18 parts by weight of the above-mentioned ethanol mixture 2, and 9.28 parts by weight of diacetone alcohol to obtain a composition (B8). The viscosity of the composition (B8) measured by the above-mentioned measuring method was 5 mPa·s.

(7-3. Production of Antistatic Film)

The diagonally stretched film obtained in the step (7-1) was used in place of the diagonally stretched film obtained in the step (1-1), the composition (B8) was used in place of the composition (B2), and the coating thickness was changed such that the thickness of the antistatic hard coat layer obtained after curing became 1.5 μm. The production and evaluation of the antistatic hard coat film, and the production and evaluation of the liquid crystal display device were performed in the same manner as those in Example 1 except for the matters described above.

Comparative Example 1

The antistatic hard coat agent was dissolved in the same manner as that in the step (1-2) in Example 1 except that the amounts of methyl ethyl ketone, the ethanol mixture 2, and diacetone alcohol were changed to 30.2 parts by weight, 4.0 parts by weight, and 6.04 parts by weight, respectively, to obtain a composition (B5) having a solid content concentration of 26%.

The production and evaluation of the antistatic hard coat film, and the production and evaluation of the liquid crystal display device were performed in the same manner as those in Example 1 except that the composition (B5) was used in place of the composition (B2).

The viscosity of the composition (B5) was 15 mPa·s.

Comparative Example 2

A composition (B6) was obtained in the same manner as that in the step (1-2) in Example 1 except that the dispersion of the metal oxide particles (1) in a chain form was not added.

The production and evaluation of the antistatic hard coat film, and the production and evaluation of the liquid crystal display device were performed in the same manner as those in Example 1 except that the composition (B6) was used in place of the composition (B2).

TABLE 1

| | | Ex. 1 | Ex. 2 | Ex. 3 | Ex. 4 |
|---|---|---|---|---|---|
| Substrate film | Type | ZNR | ZNR | ZNR | ZNR |
| | Stretching direction | Diagonal | Transverse | Diagonal | Diagonal |
| | Thickness (μm) | 25 | 25 | 47 | 25 |
| Antistatic hard coat layer | Thickness (μm) | 3 | 3 | 3 | 10 |
| | Particle aggregation solvent | MEK | MEK | MEK | MEK |
| | Particle dispersion solvent | EtOH | EtOH | EtOH | EtOH |
| | High-boiling point solvent | DAA | DAA | DAA | DAA |
| | Viscosity (mPa · s) | 1.5 | 1.5 | 1.5 | 1.5 |
| | Metal oxide particles | ATO | ATO | ATO | ATO |

TABLE 1-continued

|  |  | Ex. 1 | Ex. 2 | Ex. 3 | Ex. 4 |
|---|---|---|---|---|---|
| Evaluation | Surface resistance ($\Omega$/sq.) | $2.7 \times 10^8$ | $2.7 \times 10^8$ | $2.6 \times 10^8$ | $6.4 \times 10^6$ |
|  | Streak length | — | — | — | — |
|  | Number of streaks | 0 | 0 | 0 | 0 |
|  | Streak evaluation | 2 | 2 | 2 | 2 |
|  | Image visibility evaluation | 3 | 1 | 2 | 2 |
|  | LC drive stability evaluation | 3 | 3 | 3 | 3 |

TABLE 2

|  |  | Ex. 5 | Ex. 6 | Ex. 7 | Comp. Ex. 1 | Comp. Ex. 2 |
|---|---|---|---|---|---|---|
| Substrate film | Type | ZNR | ZNR | ZNR | ZNR | ZNR |
|  | Stretching direction | Diagonal | Diagonal | Diagonal | Diagonal | Diagonal |
|  | Thickness (μm) | 25 | 25 | 47 | 25 | 25 |
| Antistatic hard coat layer | Thickness (μm) | 3 | 3 | 1.5 | 3 | 3 |
|  | Particle aggregation solvent | MIBK | MEK | MEK | MEK | MEK |
|  | Particle dispersion solvent | EtOH | EtOH | EtOH | EtOH | EtOH |
|  | High-boiling point solvent | DAA | DAA | DAA | DAA | DAA |
|  | Viscosity (mPa · s) | 3 | 8 | 5 | 15 | 2 |
|  | Metal oxide particles | ATO | ATO | ATO | ATO | — |
| Evaluation | Surface resistance ($\Omega$/sq.) | $5.7 \times 10^8$ | $3.4 \times 10^8$ | $3.4 \times 10^8$ | $5.5 \times 10^8$ | $1.0 \times 10^{14}$ |
|  | Streak length | — | 5 cm | — | 20 cm or more | — |
|  | Number of streaks | 0 | 2 | 0 | 5 | 0 |
|  | Streak evaluation | 2 | 2 | 2 | 1 | 2 |
|  | Image visibility evaluation | 3 | 2 | 3 | 1 | 2 |
|  | LC drive stability evaluation | 2 | 3 | 3 | 2 | 1 |

In Tables, MEK represents methyl ethyl ketone, MIBK represents methyl isobutyl ketone, EtOH represents an ethanol mixture, IPA represents isopropyl alcohol, DAA represents diacetone alcohol, and ATO represents antimony-doped tin oxide. ZNR represents a diagonally stretched film manufactured using product name "ZEONOR Film ZF14-040" or product name "ZEONOR Film ZF14-070".

As evident from Tables, the number of the streaks is 2 or less in each of Examples 1 to 6 of the present invention, indicating that both the image visibility and the stability of the liquid crystal driving are excellent. On the other hand, in Comparative Example 1 where the number of the streaks is more than 2, either the image visibility or the stability of the liquid crystal driving is inferior to that in Examples 1 to 6.

Further, in Comparative Example 2 where the surface resistance value is higher than $1.0 \times 10^{10}$ $\Omega$/sq., the stability of the liquid crystal driving is inferior to that in Examples 1 to 6.

The evaluation of the image visibility in Example 2 falls behind other Examples. This shows that having a diagonally stretched film as the substrate film can improve the image visibility in the liquid crystal display device.

The substrate film used in Example 3 was thicker than that in Example 1 and thus had an increased in-plane retardation. This caused a slight change in the color tone of the image on the liquid crystal display device. However, such a change was acceptable for practical use.

The antistatic hard coat layer used in Example 4 was thicker than that in Example 1 and thus had an increased haze value. This caused a slight reduction in the visibility of the image on the liquid crystal display device. However, such a reduction was acceptable for practical use.

Example 5 used the composition (B3) in which the mix ratio of the particle aggregation solvent and the particle dispersion solvent, the mix ratio of the particle aggregation solvent and the high-boiling point solvent, and the mix ratio of the particle dispersion solvent and the high-boiling point solvent were out of the ranges considered being more preferable. As a result, the slight unevenness in the liquid crystal driving occurred due to the electrification. However, such an unevenness was acceptable for practical use.

The composition (B4) used in Example 6 had higher viscosity than the composition (B1) and thus had poor application performance, causing 5 streaks with a length of 5 cm.

REFERENCE SIGN LIST 100 antistatic film
110 substrate film
120 antistatic layer
120L, 120R edge portions of antistatic layer in application width direction X
120U surface of antistatic layer
121, 122 region near both edge portions of the antistatic layer in the application width direction X

The invention claimed is:

1. A method for producing an antistatic hard coat film comprising:
   a substrate film formed of a thermoplastic resin containing a cycloolefin polymer; and
   an antistatic hard coat layer provided on the substrate film, the antistatic hard coat layer containing electroconductive metal oxide fine particles, wherein
   the antistatic hard coat layer has a surface resistance value of $1.0 \times 10^6$ Ω/sq. or more and $1.0 \times 10^{10}$ Ω/sq. or less,
   the number of streaks each having a length of 20 cm or longer of the antistatic hard coat layer is 2 or less per area of 1,330 mm×500 mm of the antistatic hard coat layer,
   the electroconductive metal oxide fine particles in the antistatic hard coat layer are formed of one or more metal oxide selected from tin oxide doped with antimony or fluorine, indium oxide, indium oxide doped with tin or fluorine, indium oxide doped with antimony, antimony oxide, and low valence titanium oxide, and
   the electroconductive metal oxide fine particles have surfaces treated with a hydrolysable organosilicon compound,
   the method comprising:
   applying a composition in which an antistatic hard coat agent containing electroconductive metal oxide fine particles are dissolved in a particle aggregation solvent and a particle dispersion solvent onto the substrate film, to form an antistatic hard coat layer, wherein
   the composition has a viscosity of 1 mPa·s or more and 6 mPa·s or less, and
   a mixing ratio, in weight, of the particle aggregation solvent to the particle dispersion solvent is 50:50 to 85:15.

2. The method for producing an antistatic hard coat film according to claim 1, wherein
   the antistatic hard coat layer is formed by applying a composition in which an antistatic hard coat agent containing the metal oxide fine particles is dissolved in a particle aggregation solvent and a particle dispersion solvent onto the substrate film, and
   the composition has a viscosity of 1 mPa·s or more and 6 mPa·s or less.

3. The method for producing an antistatic hard coat film according to claim 1, wherein the metal oxide fine particles are antimony-doped tin oxide.

4. The method for producing an antistatic hard coat film according to claim 1, wherein
   the antistatic hard coat layer has a single-layer structure, and
   the antistatic hard coat layer has a thickness of 10 μm or less.

5. The method for producing an antistatic hard coat film according to claim 1, wherein
   the substrate film is a diagonally stretched film, and
   the substrate film has a thickness of 50 μm or less.

6. A method for producing a polarizing plate comprising the antistatic hard coat film produced by the method according to claim 1 and a polarizer, the method comprising:
   bonding the polarizer and the substrate film to each other.

7. A method for producing a touch panel, the method comprising:
   providing the polarizing plate produced by the method according to claim 6 on a viewing side of a liquid crystal cell.

8. The method for producing a touch panel according to claim 7, wherein the liquid crystal cell is an IPS mode liquid crystal cell.

9. The method for producing a touch panel according to claim 7, further comprising: providing a cover glass on an outermost surface on the viewing side of the liquid crystal cell.

10. A method for producing a liquid crystal display device, the method comprising:
    providing the polarizing plate produced by the method according to claim 6 on a viewing side of a liquid crystal cell.

11. The method for producing an antistatic hard coat film according to claim 1, wherein the particle dispersion solvent is ethanol mixture that is a mixed solvent containing ethanol and an alcohol other than ethanol.

12. The method for producing an antistatic hard coat film according to claim 1, wherein
    the composition further contains a high-boiling point solvent having a boiling point of 100° C. or higher, and
    a mixing ratio, in weight, of the particle aggregation solvent to the high-boiling point solvent is 67:33 to 95:5.

* * * * *